United States Patent
Xu et al.

(10) Patent No.: US 11,940,811 B2
(45) Date of Patent: Mar. 26, 2024

(54) CLEANING SYSTEM AND CLEANING METHOD

(71) Applicant: SUZHOU RADIANT PHOTOVOLTAIC TECHNOLOGY CO., LTD., Jiangsu (CN)

(72) Inventors: Jianrong Xu, Jiangsu (CN); Jianxiang Lu, Jiangsu (CN); Fei Xu, Jiangsu (CN)

(73) Assignee: SUZHOU RADIANT PHOTOVOLTAIC TECHNOLOGY CO., LTD., Jiangsu (CN)

( * ) Notice: Subject to any disclaimer, the term of this patent is extended or adjusted under 35 U.S.C. 154(b) by 369 days.

(21) Appl. No.: 17/277,370

(22) PCT Filed: Nov. 9, 2019

(86) PCT No.: PCT/CN2019/116916
§ 371 (c)(1),
(2) Date: Mar. 18, 2021

(87) PCT Pub. No.: WO2020/094147
PCT Pub. Date: May 14, 2020

(65) Prior Publication Data
US 2021/0356973 A1    Nov. 18, 2021

(30) Foreign Application Priority Data
Nov. 9, 2018    (CN) .................. 201811334459.X

(51) Int. Cl.
*G05D 1/00*    (2006.01)
*B08B 13/00*    (2006.01)
(Continued)

(52) U.S. Cl.
CPC .......... *G05D 1/0287* (2013.01); *B08B 13/00* (2013.01); *B25J 5/005* (2013.01); *B25J 9/1697* (2013.01);
(Continued)

(58) Field of Classification Search
None
See application file for complete search history.

(56) References Cited

U.S. PATENT DOCUMENTS 8,046,101 B2    10/2011  Hisatani et al.
2018/0311822 A1*  11/2018  Kaminka .............. B25J 9/1682
2019/0200519 A1*  7/2019  Chrysanthakopoulos ...................
                                                            A01M 21/04

FOREIGN PATENT DOCUMENTS

CN    104460669 A    3/2015
CN    105783915 A    7/2016
(Continued)

OTHER PUBLICATIONS

CN107570439 English translation, accessed on Jul. 2023. (Year: 2018).*
CN 107570439 English translation, accessed on Sep. 2023. (Year: 2018).*

*Primary Examiner* — Eric W Golightly
*Assistant Examiner* — Arlyn I Rivera-Cordero
(74) *Attorney, Agent, or Firm* — Rivka Friedman

(57) ABSTRACT

A cleaning system and a cleaning method configured for cleaning task of solar panels are provided. The cleaning system includes an operation region, cleaning robots, shuttle robots, and a data processing system. The cleaning method includes a first carrying step, a cleaning step, and a second carrying step.

16 Claims, 17 Drawing Sheets

(51) Int. Cl.
  *B25J 5/00*   (2006.01)
  *B25J 9/16*   (2006.01)
  *B25J 18/02*   (2006.01)
  *B66F 9/06*   (2006.01)
  *F24S 40/20*   (2018.01)
  *G06Q 10/0631*   (2023.01)
  *H02S 40/10*   (2014.01)

(52) U.S. Cl.
  CPC ............. *B25J 18/025* (2013.01); *B66F 9/063* (2013.01); *F24S 40/20* (2018.05); *G05D 1/0217* (2013.01); *G05D 1/0219* (2013.01); *G05D 1/0225* (2013.01); *G05D 1/0234* (2013.01); *G05D 1/0246* (2013.01); *G06Q 10/06313* (2013.01); *G06Q 10/06315* (2013.01); *H02S 40/10* (2014.12)

(56) References Cited

FOREIGN PATENT DOCUMENTS

| | | | | |
|---|---|---|---|---|
| CN | 206154318 U | 5/2017 | | |
| CN | 107544519 A | 1/2018 | | |
| CN | 107570439 | * 1/2018 | ............. | Y02E 10/50 |
| CN | 107570439 A | 1/2018 | | |
| CN | 107621825 A | 1/2018 | | |
| CN | 108543789 A | 9/2018 | | |
| CN | 09375623 A | 2/2019 | | |
| CN | 109361352 A | 2/2019 | | |
| CN | 109379038 A | 2/2019 | | |
| JP | 4477685 B1 | 6/2010 | | |

* cited by examiner

CLEANING SYSTEM AND CLEANING METHOD

CROSS REFERENCE TO RELATED APPLICATIONS

This application claims priority of Chinese patent Application No. CN201811334459.X filed on Nov. 9, 2018 with the National Intellectual Property Administration, titled" CLEANING SYSTEM AND CLEANING METHOD", which is incorporated by reference in the present application in its entirety.

BACKGROUND OF INVENTION

Field of Invention

The present disclosure relates to a cleaning system and a cleaning method configured for cleaning task of solar panels.

Description of Prior Art

Under a situation that fossil fuels are gradually decreasing, solar energy, as a new renewable energy, has become an important part of energy usage for humans. In the past ten years, application technology of the solar energy has been rapidly developed in countries around the world.

Because operating environments of solar panels must be outdoors, the biggest problem affecting their operation is not wind, rain, thunder, or lightning, but all-year-round accumulated dust and snow. Dust or other attached matters on the solar panels can affect a light transmittance of the panels and hinder photoelectric efficiency, thereby seriously affecting efficiency of the panels in directly obtaining sunlight, reducing energy absorption and conversion efficiency of the panels, and reducing power generation efficiency.

Therefore, surfaces of solar panels in every photovoltaic power station need to be cleaned, and it is obvious that manual cleaning is inefficient and risky. Correspondingly, the industry has developed a cleaning robot for the solar panels to clean surfaces thereof, which can effectively improve cleaning efficiency without a problem of personal safety hazards of high-rise cleaning tasks.

Since placement of the solar panels or panel arrays is not configured in one piece, but is configured in multiple positions in a certain region, this results in large spatial intervals between the solar panels or panel arrays in different positions in the region. Furthermore, the cleaning robot cannot directly cross these spatial intervals on different solar panels. If the cleaning robot is disposed on each solar panel, not only is hardware cost too high, but usage efficiency of each cleaning robot is too low, resulting in large waste of resources.

SUMMARY OF INVENTION

A purpose of the present disclosure is to provide an intelligent cleaning system, which can automatically complete cleaning works of all solar panels in a photovoltaic power station under control of a computer to solve the technical problem that a large number of solar panels or solar panel arrays need to be cleaned.

In order to realize the aforesaid purpose, the present disclosure provides a cleaning system configured to clean solar panels, including: an operation region including cleaning regions and more than two channel regions located between the cleaning regions; cleaning robots configured to perform cleaning task on the cleaning regions; shuttle robots configured to carry the cleaning robot on the channel regions; and a data processing system connected to the cleaning robot and/or the shuttle robot, configured to control the shuttle robot to carry the cleaning robot to the cleaning regions or take away the cleaning robot from the cleaning regions, or configured to control the cleaning robot to complete the cleaning task on the cleaning regions.

Furthermore, the cleaning regions include: a first shuttle region, wherein the first shuttle region is a region outside one of the cleaning regions and close to a side of the one of the cleaning regions; and a second shuttle region, wherein the second shuttle region is a region within the one of the cleaning regions, close to a side of the one of the cleaning regions, and defined opposite with the first shuttle region.

Furthermore, the shuttle robot includes: a vehicle body; a shuttle device including a shuttle platform configured to place the cleaning robot; a height regulating device configured to regulate a height of the shuttle platform; and/or an angle regulating device configured to regulate an angle of the shuttle platform.

In order to realize the aforesaid purpose, the present disclosure further provides a cleaning method used for task of cleaning the solar panels, including following steps: a first carrying step: carrying a cleaning robot to cleaning regions by a shuttle robot; a cleaning step: performing a cleaning task on the cleaning regions by the cleaning robot; and a second carrying step: carrying the cleaning robot away from the cleaning regions by a shuttle robot.

Furthermore, before the first carrying step, the following steps are further included: a step of obtaining information: obtaining operation region information and job task information; and a step of calculating numbers of robots: calculating the numbers of the cleaning robot and the shuttle robot need to be deployed; wherein the operation region information includes a map of the operation region, the operation region includes all of the cleaning regions and two or more of the channel regions between the cleaning regions; at least one positioning point is disposed in the channel region, at least one identifiable label is disposed in each positioning point, the identifiable label stores a position and a serial number of the positioning point, the operation region further includes serial numbers, dimensions, and positions of each cleaning region in the operation region and the position and the serial number of the at least one positioning point; the job task information further includes a serial number of the cleaning region needed to be cleaned and an operation time range allowed for the cleaning task.

Furthermore, the step of calculating the numbers of the robots, specifically includes following steps: a step of obtaining traveling speed: obtaining a traveling speed of the cleaning robot and a traveling speed of the shuttle robot; a step of calculating total labor hour: calculating required labor hours to complete the cleaning task in each cleaning region according to the dimensions of the cleaning region that needs to be cleaned of the job task information and the traveling speed of the cleaning robot; a step of calculating a number of the cleaning robots: calculating the number M of the cleaning robot that need to be deployed according to a total number of the cleaning regions that need to be cleaned, the labor hour required to complete the cleaning task in each cleaning region, and the operation time range; a step of calculating a distance: calculating a total distance that the shuttle robot needs to travel according to the positions of the cleaning regions that need to be cleaned; a step of calculating a number of the shuttle robots: calculating the number N of the shuttle robot that needs to be deployed according to a total mileage and the traveling speed of the shuttle robot, Furthermore, in the first carrying step or the second carrying step, during traveling, the shuttle robot executes the following steps: a step of obtaining an instruction: obtaining a first control instruction released by the data processing system, wherein the first control instruction includes an end position of a carrying path and a recommended route of the shuttle robot, and includes a serial number of each positioning point on the recommended route and a corresponding preset traveling direction of each positioning point; a traveling step: traveling along the recommended route to the end according to the first control instruction; a positioning step: reading the identifiable label of any positioning point and obtaining the position and the serial number of the positioning point; and an orienting step: determining whether an actual traveling direction is consistent with the preset traveling direction corresponding to the positioning point, if not, adjusting an actual travel direction to the preset travel direction.

Furthermore, in the first carrying step or the second carrying step, when the shuttle robot reads the identifiable label of any positioning point, the shuttle robot sends a feedback signal to the data processing system; the data processing system obtains a real-time position of the shuttle robot according to the feedback signal.

Furthermore, in the first carrying step or the second carrying step, the following steps are comprised: a step of collecting pictures: using a camera to collect real-time picture, when the shuttle robot is traveling. a step of adjusting directions: adjusting a traveling direction of the shuttle robot by judging a feasible traveling route and/or positions of obstacles according to the real-time pictures.

Furthermore, the first carrying step includes following steps: a step of traveling of the shuttle robot: making the shuttle robot carrying the cleaning robot travel to the first shuttle region of one of the cleaning regions; a jointing step: jointing the shuttle robot to the cleaning region; and a step of transferring the cleaning robot: making the cleaning robot travel to the second shuttle region of the cleaning region.

Furthermore, the second carrying step includes following steps: a step of traveling of the shuttle robot: making the shuttle robot which is unloaded travel to the first shuttle region of one of the cleaning regions; a jointing step: jointing the shuttle robot to the cleaning region; and a step of transferring the cleaning robot: making the cleaning robot travel to the second shuttle region of the cleaning region.

Furthermore, before the jointing step, the cleaning method further includes following steps: a step of first adjusting the shuttle robot: adjusting a height and a tilt angle of the shuttle platform by the shuttle robot, and adjusting a position of the shuttle robot; the step of adjusting the shuttle robot includes following steps: a step of adjusting the height and the tilt angle: adjusting the height and the tilt angle of the shuttle platform to make an upper surface of the shuttle platform and an upper surface of the cleaning region on a same plane; a direction adjusting step: adjusting a direction of an entrance of the shuttle platform to make the entrance of the shuttle platform face the cleaning region; a step of sensing a distance: obtaining a distance S between the shuttle robot and a bezel of the cleaning region by the shuttle robot to determine whether the actual distance S is greater than a preset distance threshold value S0; a step of adjusting positions making the shuttle robot turn right at a first angle A and go forward with a first distance B, then making the shuttle robot turn left at the first angle A and go backward with a second distance C to travel to the first shuttle region, when the distance S is greater than S0; wherein B is (S-S0)/sinA, C is (S-S0)/tanA; making the shuttle robot turn left at the first angle A and go forward with the first distance B, then making the shuttle robot turn right at the first angle A and go backward with the second distance C to travel to the first shuttle region, when the distance S is less than S0; wherein B is (S0-S)/sinA, C is (S-S0)/tanA.

Furthermore, after the step of transferring the cleaning robot, the cleaning method includes following steps: a step of releasing jointing: making the shuttle robot to release jointing to make the upper surface of the shuttle platform separate from the upper surface of the cleaning region; a step of adjusting the shuttle robot again: adjusting the height and the angle of the shuttle platform by the shuttle robot to make the height of the shuttle platform to a lowest position and keep in a horizontal state;

in a step of driving the shuttle robot away, making the shuttle robot away from the cleaning region;

Furthermore, in the jointing step, making the shuttle robot to extend a bridge board to connect with the upper surface of the shuttle platform and the upper surface of the operation region; in the releasing jointing step, making the shuttle robot retract the bridge board to make the upper surface of the shuttle platform separate from the upper surface of the operation region.

Furthermore, in the second carrying step, before the jointing step, the cleaning method comprises: a step of inspecting the position of the cleaning robot: making the shuttle robot to judge whether the cleaning robot is located in the second shuttle region; if not, proceed to a next step; and a step of adjusting the position of the cleaning robot: adjusting the position of the cleaning robot to the second shuttle region.

Furthermore, the step of inspecting the position of the cleaning robot includes following steps: in a step of obtaining the picture, obtaining a real-time picture, wherein the picture includes a picture mark on the cleaning robot;

calculating a deviation value D of the position from a preset position in the real-time picture in a step of calculating the deviation value;

a step of judging deviation: judging that the cleaning robot has arrived the second shuttle region if an absolute value of the deviation value D is less than a preset threshold value D0; judging that the cleaning robot has deviated from the second shuttle region if the absolute value of the deviation value D is greater than or equal to the preset threshold value D0.

Furthermore, the step of adjusting the position of the cleaning robot includes following steps: a step of calculating a deviation value: calculating the deviation value D of the position from a preset position in the real-time picture; a step of judging a deviation direction: judging the deviation direction of the cleaning robot according to the deviation value; a step of judging the picture mark: judging whether the picture mark is located on a front surface or a back surface of the cleaning robot; a step of controlling traveling: if the cleaning robot deviated to left, and the picture mark is disposed on the front surface of the cleaning robot, the cleaning robot turns right at a second angle F and moves backward with a second distance G, and then turns left at the second angle F, moves forward with a third distance H, and travels to the second shuttle region; if the cleaning robot deviated to left, and the picture mark is disposed on the back surface of the cleaning robot, the cleaning robot turns right at the second angle F and moves forward with the second distance G, and then turns left at the second angle F, moves backwards with the third distance H, and travels to the second shuttle region; if the cleaning robot deviated to right, and the picture mark is disposed on the front surface of the cleaning robot, the cleaning robot turns left at the second angle F and moves backward with the second distance G, and then turns right at the second angle F, moves forward with the third distance H, and travels to the second shuttle region; if the cleaning robot deviated to right, and the picture mark is disposed on the front surface of the cleaning robot, the cleaning robot turns left at the second angle F and moves backward with the second distance G, and then turns right at the second angle F, moves forward with the third distance H, and travels to the second shuttle region; if the cleaning robot deviated to right, and the picture mark is disposed on the back surface of the cleaning robot, the cleaning robot turns left at the second angle F and moves forward with the second distance G, and then turns right at the second angle F, moves backward with the third distance H, and travels to the second shuttle region; wherein G is E/sinF, H is E/tanF.

Comparing to the prior art, the advantage of the present disclosure is providing a cleaning system and cleaning method for solar panel cleaning work to dispatch a suitable number of cleaning robots and shuttle robots according to workload of the cleaning task, using the cleaning robots to complete the cleaning task on the solar panels or the solar panel arrays, and using the shuttle robot to transfer the cleaning robot between the multiple solar panel arrays, can complete the cleaning tasks of all solar panels and panel arrays in the shortest time.

DESCRIPTION OF DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which those skilled in the art can derive further figures without making any inventive efforts.

Figure 1:
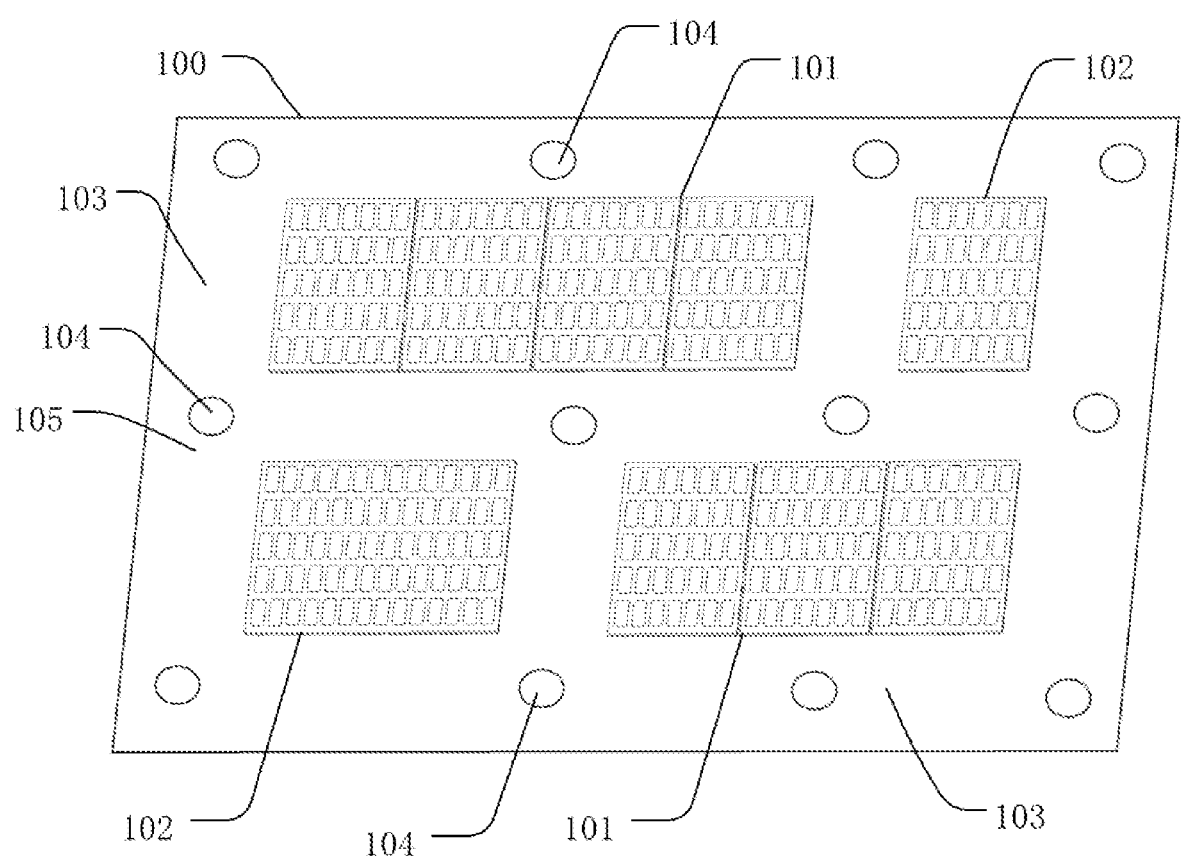
FIG. 1 is a schematic diagram of operation regions of one embodiment of the present disclosure.

The reference numbers of components in the drawings as follows:
- 100: operation region, 200: cleaning robot, 300: shuttle robot, 400: data processing system, 500: cleaning region;
- 101: solar panel array, 102: solar panel, 103: channel region, 104: positioning point, 105: intersection;
- 201: first wireless communicating unit, 301: second wireless communicating unit, 401: third wireless communicating unit
- 310: vehicle body, 320: shuttle device, 330: angle regulating device, 340: processor, 350: height regulating device;
- 311: vehicle body noumenon, 312: traveling device, 313: vehicle frame, 314: circuit board
- 321: shuttle platform, 322: baffle, 322a: left baffle, 322b: rear baffle, 322c: right baffle, 323: entrance;
- 324: anti-collision component, 325a, 325b: sliding shaft base, 325c, 325d: first chute;
- 326a, 326b: rotating shaft base, 326c, 326d: base via hole, 327: bridge board;
- 328: first expansion link; 329: first expansion link controller, 331: sliding shaft;
- 322: second expansion link, 333: rotating shaft, 334: expansion link mounting frame, 335: second expansion link controller;
- 351: frame, 352: first bracket, 353: second bracket, 354: pin roll, 355a, 355b: first guide rail;
- 356a, 356b: second guide rail, 357a, 357b: second chute, 358a, 358b: third chute;
- 359: third expansion link, 360: third expansion link controller;

501: upper end of the cleaning region, 502: lower end of the cleaning region, 503: left end of the cleaning region, 504: right end of the cleaning region;

505: first shuttle region, 506: second shuttle region;

601: through-beam type sensor, 601a: emission terminal, 601b: receiving terminal, 602: distance sensor, 603: tilt angle sensor;

604: positioning device, 605: electronic compass, 606: image sensor, 607: illumination device, 608: obstacle-avoidance sensor;

3521a, 3521b: first connecting link, 3522: first beam, 3523a, 3523b: first pulley, 3524: sleeve;

3531a, 3531b: second connecting link, 3532: second beam, 3533a, 3533b: second pulley.

DETAILED DESCRIPTION OF PREFERRED EMBODIMENTS

The preferred embodiments of the present disclosure are described below with reference to the accompanying drawings, which are used to take examples and exemplify the present disclosure can be implemented. The technical contents of the present disclosure can be fully described to those skilled in the art from these embodiments to make the technical content of the present disclosure be clearer and more easier to understand. However, the present disclosure can be presented in many different forms of embodiments, and the scope of the present disclosure is not limited to the embodiments set forth herein.

In the accompanying figures, elements with same structures are used same reference numbers to indicate, and components that have similar structure or function are denoted by similar reference numbers. When a component is described as "connected to" another component, it can be understood as "directly connected to", or a component is "connected to" through an intermediate component to another component.

As illustrated in FIG. 1, an operation region 100 is disposed in a solar power station. In the operation region, a plurality of solar panel arrays 101 are included. A tilt angle of each solar panel array 101 relative to a horizontal plane is a certain angle from 15 to 45 degrees, which ensures direct sunlight to directly irradiate on the solar panel as much as possible. In most solar power stations, the tilt angles of all solar panels relative to the horizontal plane (referred as panel tilt angles or tilt angles) are same. In some solar power plants, the tilt angles of different solar panels may be different. Moreover, tilt angles of some panels are adjustable or variable.

As illustrated in FIG. 1, each solar panel array 101 includes a plurality of solar panels 102 (panels) spliced together. The plurality of the solar panel arrays 101 and/or the plurality of solar panels 102 can be arranged into a matrix. A channel region 103 is formed between any two adjacent solar panel arrays 101 or the solar panels 102. In this embodiment, the plurality of cross-connected channel regions 103 form a crisscross channel network together.

Figure 2:
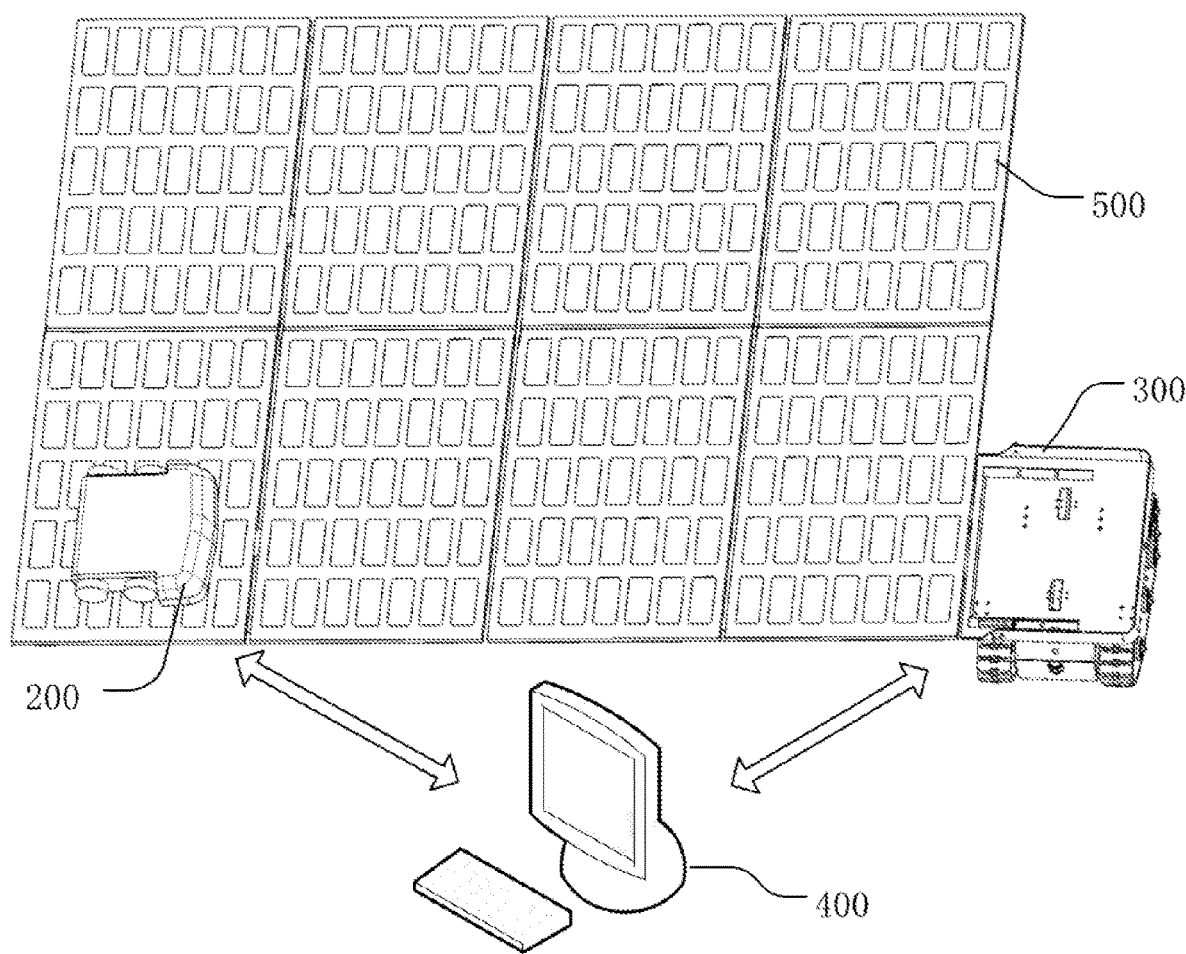
FIG. 2 is a schematic diagram of an operation state of a cleaning system of one embodiment of the present disclosure.
Figure 3:
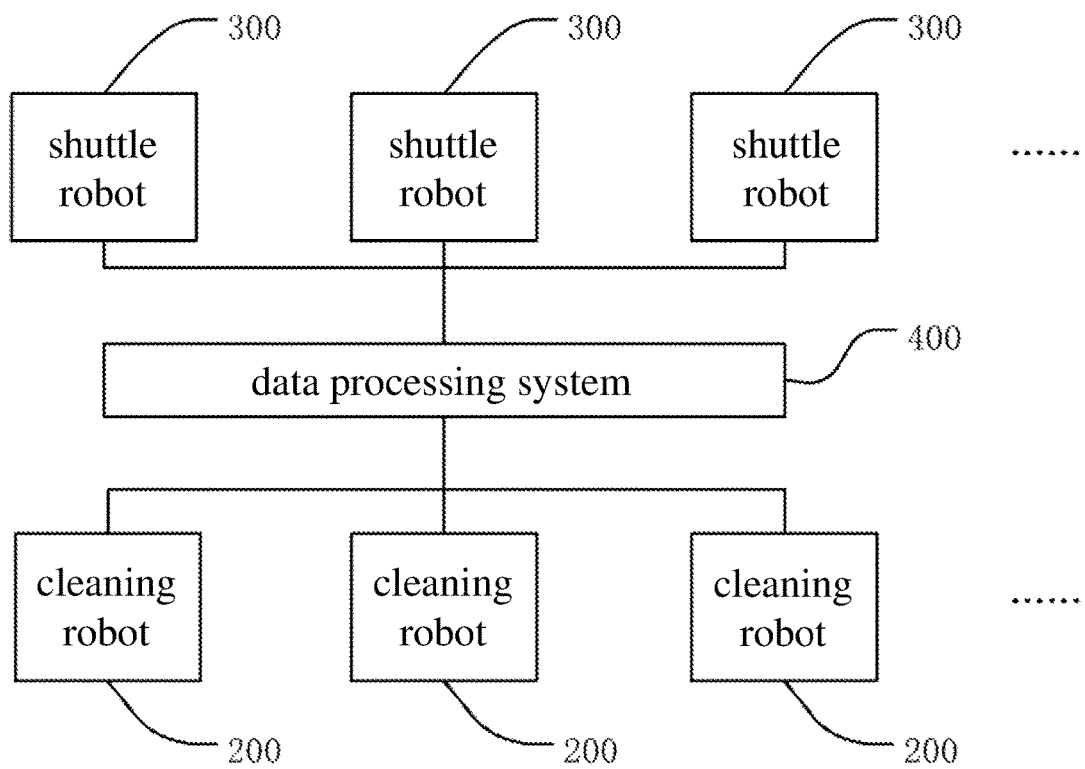
FIG. 3 is a structural schematic diagram of the cleaning system of one embodiment of the present disclosure.

As illustrated in FIG. 2 to FIG. 3, this embodiment provides a cleaning system, includes cleaning robots 200, shuttle robots 300, and a data processing system 400. The operation region 100 is a working region where the cleaning robots 200 and the shuttle robots 300 complete the solar panel cleaning tasks.

During a normal operation of the solar power station, some solar panels or solar panel arrays can be attached with dust or stains and need to be cleaned. Each solar panel or solar panel array needs to be cleaned is the cleaning region 500. The cleaning robot 200 can complete cleaning tasks on the solar panels or the solar panel arrays and can effectively clean every region on the panels or the panel arrays. The shuttle robot 300 can carry the cleaning robot 200 from a storage place of the cleaning robot to an upper surface of a cleaning area 500 (the panel or the panel array that needs to be cleaned), from the upper surface of one cleaned panel array to an upper surface of another cleaning region 500 (the panel or the panel array that needs to be cleaned), or from the upper surface of one cleaned region 500 to the storage place of the cleaning robot.

Figure 4:
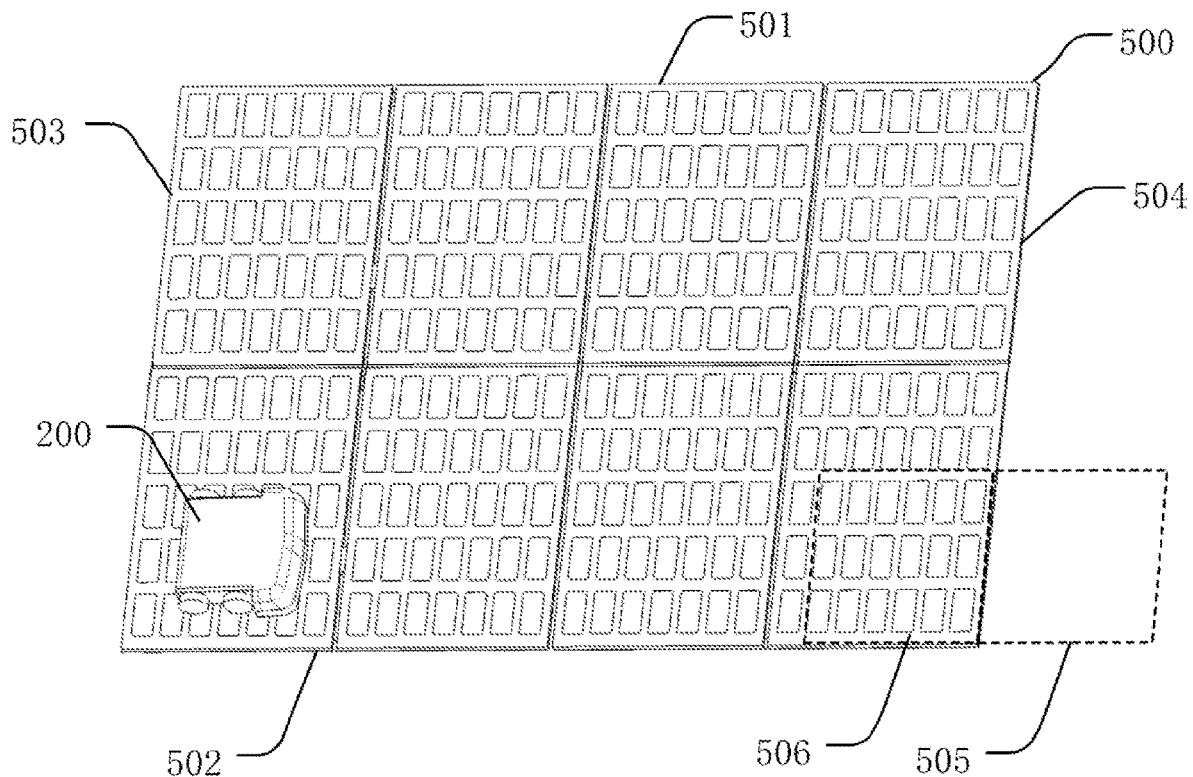
FIG. 4 is a structural schematic diagram of cleaning regions of one embodiment of the present disclosure.

As illustrated in FIG. 4, preferably, each cleaning region 500 is a group of composite rectangular panel arrays, and peripheral edges thereof are defined as an upper end of the cleaning region 501, a lower end of the cleaning region 502, a left end of the cleaning region 503, and a right end of the cleaning region 504.

When one cleaning robot 200 is carried by the shuttle robot 300 to one cleaning region 500, preferably, the cleaning robot 200 travels from the left end of the cleaning region 503 or the right end of the cleaning region 504 to the cleaning region 500. Similarly, when one cleaning robot 200 is transferred from one cleaning region 500 by one shuttle robot 300, preferably, the cleaning robot 200 travels from the left end of the cleaning region 503 or the right end of the cleaning region 504 to the shuttle robot 300.

As illustrated in FIG. 4, a first shuttle region 505 and a second shuttle region 506 disposed opposite to each other are disposed in each cleaning region 500. The first shuttle region 505 and the second shuttle region 506 are respectively disposed on two sides of the left end of the cleaning region 503 or the right end of the cleaning region 504. In this embodiment, the first shuttle region 505 is a region outside the cleaning region 500 close to the right end of the cleaning region 504, and the second shuttle region 506 is a region within the one of the cleaning regions close to the right end of the cleaning region 504. Preferably, the first shuttle region 505 and the second shuttle region 506 are close to a lower section of the right end of the cleaning region 504.

To determine which solar panel arrays in the photovoltaic power station need to be cleaned, there are several common following solutions. The first one is a partition estimation method. Natural environments of the plurality of panel arrays adjacent to each other in one small region (the region can be freely defined) are similar. Therefore, pollution levels of the panels in this region are similar. One solar panel is randomly selected, then its pollution level is inspected, to judge whether the panel needs to be cleaned. If the panel needs to be cleaned, all panels in this region needs to be cleaned. If the operation region of the power station covers a large area, the large operation region can be divided into a plurality of small operation regions, and sampling inspection can be carried out in different regions. The second is a regular cleaning method. According to the natural environment of the operation region, all the panel arrays in the operation region are cleaned regularly. If there is a lot of sand or precipitation in the operation region, attached matters on surfaces of the solar panel are heavy. It may need to be cleaned one to two times per day. If there is less sand or precipitation in the operation region, the attached matters on the surfaces of the solar panels are less. It can even be cleaned every ten days. The above two methods are indiscriminate processing for the plurality of the solar panel arrays. The accuracy is relatively poor. There may be some situations that the surfaces of the panels are with less attached matter but are cleaned by the cleaning robots. The third one is a separate inspection method, which carefully inspects the pollution level of each panel array to determine which panel arrays or panel need to be cleaned. This method is more accurate but less efficient.

As illustrated in FIG. 3, the data processing system 400, which preferably is a physical server or a cloud server, is connected to the cleaning robots 200 and/or the shuttle robots 300 to realize data exchange between the cleaning robots 200 and/or the shuttle robots 300, sends control instructions to the cleaning robots 200 and/or the docking robots 300, and meanwhile, obtains feedback data from the cleaning robot 200 and/or the shuttle robot 300, such as real-time position coordinates of the above two robots, and image data collected by the two robots in real time. Therefore, the data processing system 400 can realize real-time monitoring for the cleaning task process of the cleaning robots 200 and traveling and shuttle processes of the shuttle robot 300, can control the shuttle robot 300 to move normally in the channel network of the operation region 100, and can control the shuttle robot 300 to joint with the solar panel arrays 101 of the cleaning regions.

After the data processing system 400 obtains the information about which solar panel array 101 needs to be cleaned (some panel serial numbers), numbers of the shuttle robots 300 and the cleaning robots 200 required for the cleaning task is estimated by combining with the time allowed for cleaning task in the photovoltaic power station. The data processing system 400 calls one shuttle robot 300 to carry the cleaning robot 200 to one certain panel array that needs to be cleaned. The cleaning robot 200 performs a full cleaning task on the panel array. After the cleaning task for the panel array is completed, the data processing system 400 calls one shuttle robot 300 to carry the cleaning robot 200 from the upper surface of one panel array that has been cleaned to an upper surface of another panel array that needs to be cleaned, or to the storage place of the cleaning robots.

The cleaning robot 200 is a product independently developed by the applicant. Please refer to related patents applied by the applicant from years 2016 to 2018 for a series of solar panel cleaning robots. After the cleaning robot 200 is transported to the solar panel array, it can travel freely on the panel array, can travel around every corner of the panel array, and can complete the cleaning task of the entire panel array while traveling, and redundant description will not be mentioned herein.

Figure 5:
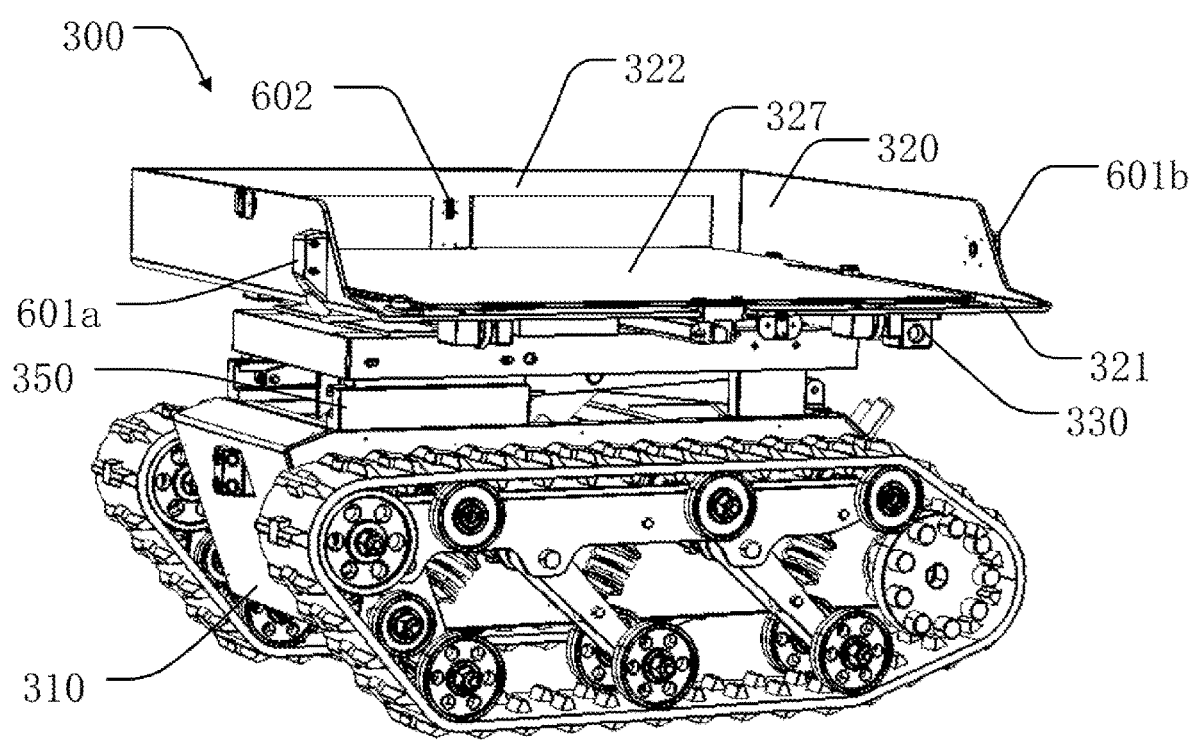
FIG. 5 is a structural schematic diagram of a shuttle robot of one embodiment of the present disclosure under a shuttle platform being in a flat state.

As illustrated in FIG. 5, this embodiment provides a shuttle robot 300, which includes a vehicle body 310, a shuttle device 320, an angle regulating device 330, and/or a height regulating device 350.

Figure 6:
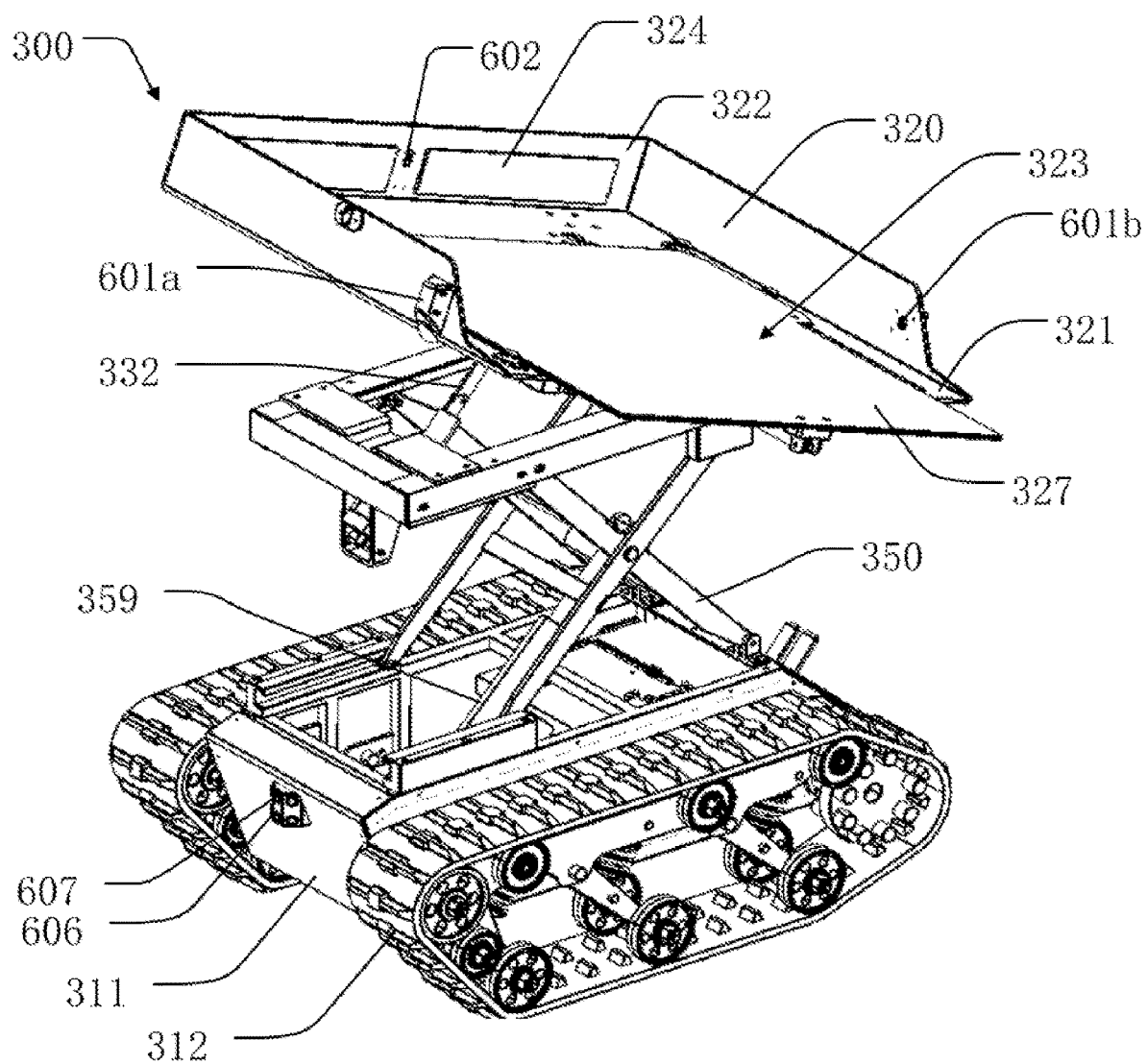
FIG. 6 is a structural schematic diagram of the shuttle robot of one embodiment of the present disclosure under the shuttle platform being in a tilt state.
Figure 7:
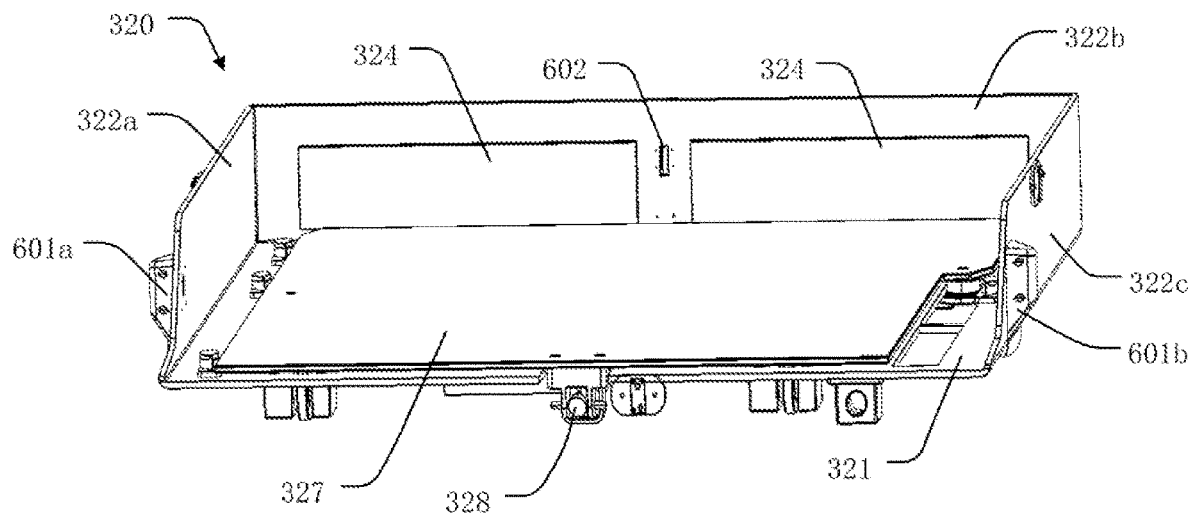
FIG. 7 is a structural schematic diagram of a top section of a shuttle device of one embodiment of the present disclosure.

As illustrated in FIGS. 5 to 7, the shuttle device 320 includes a shuttle platform 321 configured to place the cleaning robot 200. The shuttle platform 321 is rotatably connected to the top or upper half of the vehicle body 310. During shuttle processes, the cleaning robot 200 travels to an upper surface of one panel from the upper surface of the shuttle platform 321 (on-board process), or travel from an upper surface of one panel to the upper surface of the shuttle platform 321 (off-board process).

As illustrated in FIG. 7, the shuttle device 320 includes a baffle 322 that protrudes from an edge of the shuttle platform 321 and is perpendicular to the shuttle platform 321. The baffle 322 includes a left baffle 322a, a rear baffle 322b, and a right baffle 322c that are encircled into a concave shape. An opening terminal of the left baffle 322a and an opening terminal of the right baffle 322c form an entrance 323 between thereof.

The shuttle device 320 also includes an anti-collision component 324, which preferably is an anti-collision strip, disposed on an inner side wall of the rear baffle 322b. Selectively, one anti-collision strip (not shown in the figure) can also be disposed on an inner side wall of the left baffle 322a and/or an inner side wall the right baffle 322c.

The shuttle device 320 further includes a bridge board 327 and a first expansion link 328. The bridge board 327 is slidably mounted on the upper surface of the shuttle platform 321. One end of the first expansion link 328 is connected to a lower surface of the shuttle platform 321, and the other end thereof is connected to the lower surface of bridge board 327. The first expansion link 328 is a hydraulic expansion link or an electric expansion link. The first expansion link 328 has a first expansion link controller 329. When the first expansion link controller 329 receives commands of electrical signals, it can control the first expansion link 328 to adjust a length thereof. When the length of the first expansion link 328 is shortened to shortest, the bridge board 327 is located on the upper surface of the shuttle platform 321. When the length of the first expansion link 328 is extended, the bridge board 327 extends a distance toward a direction of the entrance 323. When a distance between the shuttle robot 300 and the solar panel array 101 is the smallest, and an angle of the shuttle platform 321 is adjusted to be consistent with the solar panel array 101, the first expansion link 328 is extended with a certain distance, and the bridge board 327 is extended toward the solar panel array 101 to make the shuttle platform 321 connect to the solar panel array 101. Therefore, it is convenient for the cleaning robot 200 smoothly traveling from the shuttle platform 321 to the solar panel array 101 (the cleaning region), or traveling from the solar panel array 101 (the cleaning region) to the shuttle platform 321. After the cleaning robot 200 is completely transferred, the length of the first expansion link 328 is shortened to the shortest, and the bridge board 327 is retracted to the upper surface of the shuttle platform 321.

As illustrated in FIG. 6, the vehicle body 310 includes a vehicle body noumenon 311. Traveling devices 312 (such as wheels) are disposed on two sides of a bottom section of the vehicle body noumenon 311, which are preferably crawler wheel sets having good adaptability to pavement and good passing performance.

Figure 10:
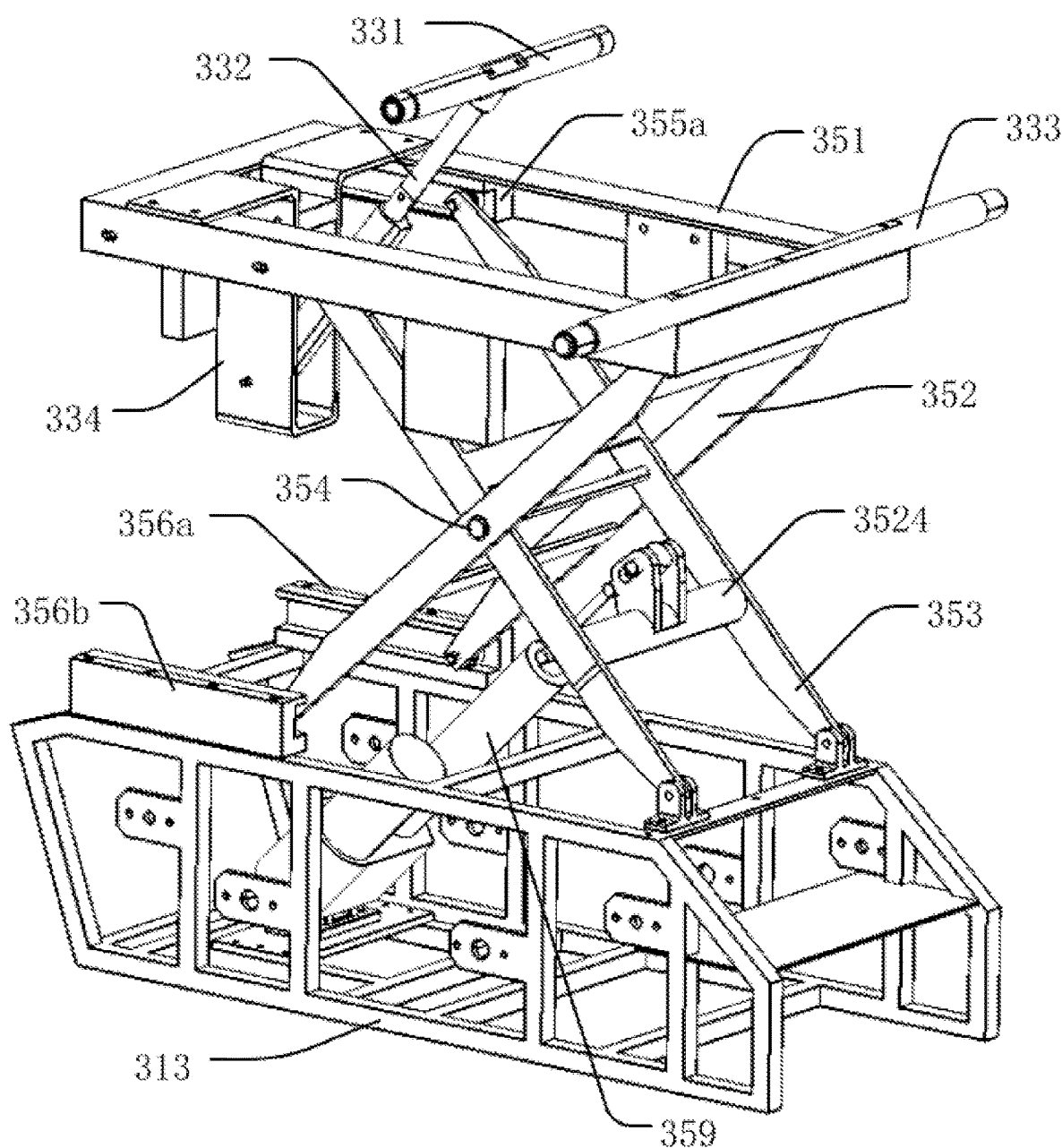
FIG. 10 is a structural schematic diagram of a height regulating device of one embodiment of the present disclosure in an unfolded state.

As illustrated in FIG. 10, the vehicle body noumenon 311 includes a vehicle frame 313. The vehicle frame 313 is a three-dimensional frame, which an overall shape is similar to a rectangular parallelepiped. The frame 313 includes a plurality of transverse brackets disposed horizontally and a plurality of longitudinal brackets disposed vertically. The longitudinal brackets are perpendicular to a horizontal plane or maintains a certain angle with the horizontal plane. One or more baffles are fixed on a top surface, a lateral surface or a bottom surface of the vehicle frame 313. The baffles and the frame 313 encircle to form the vehicle body noumenon 311 together.

Figure 11:
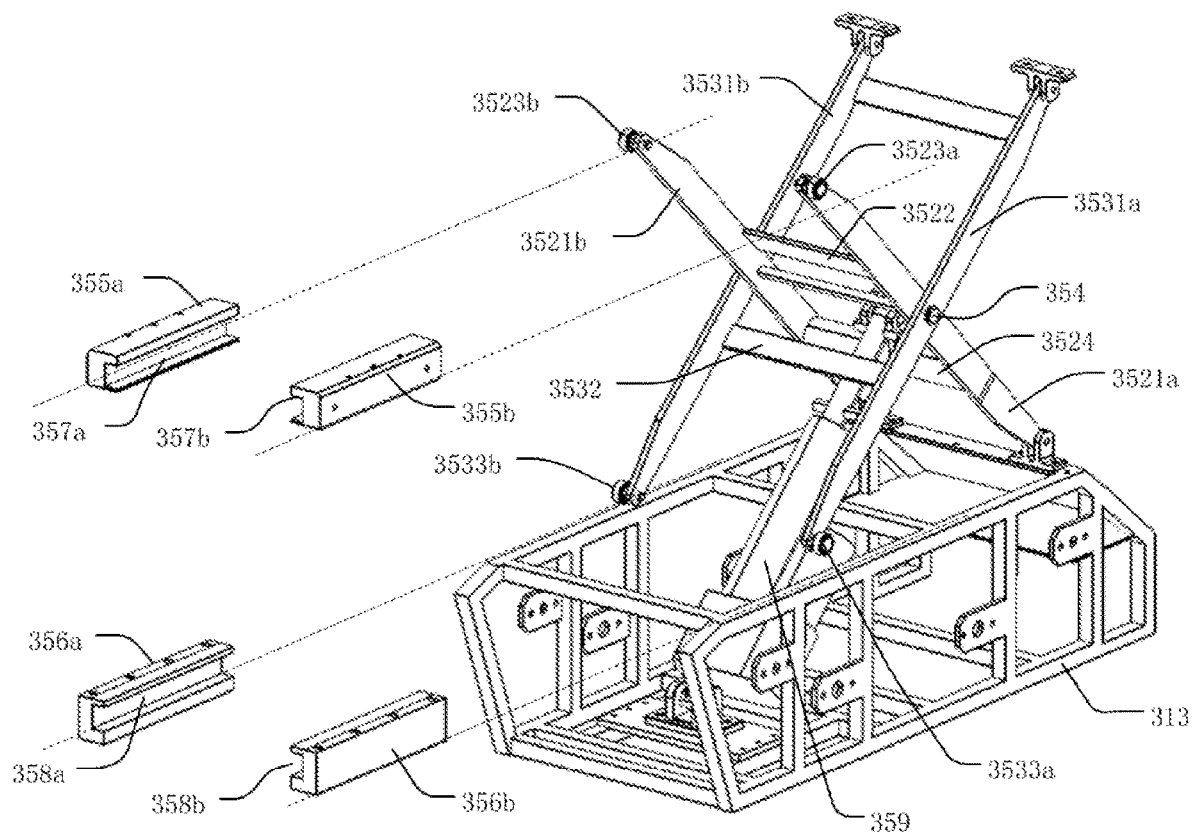
FIG. 11 is a decomposition structural schematic diagram of the height regulating device of one embodiment of the present disclosure in the unfolded state.
Figure 12:
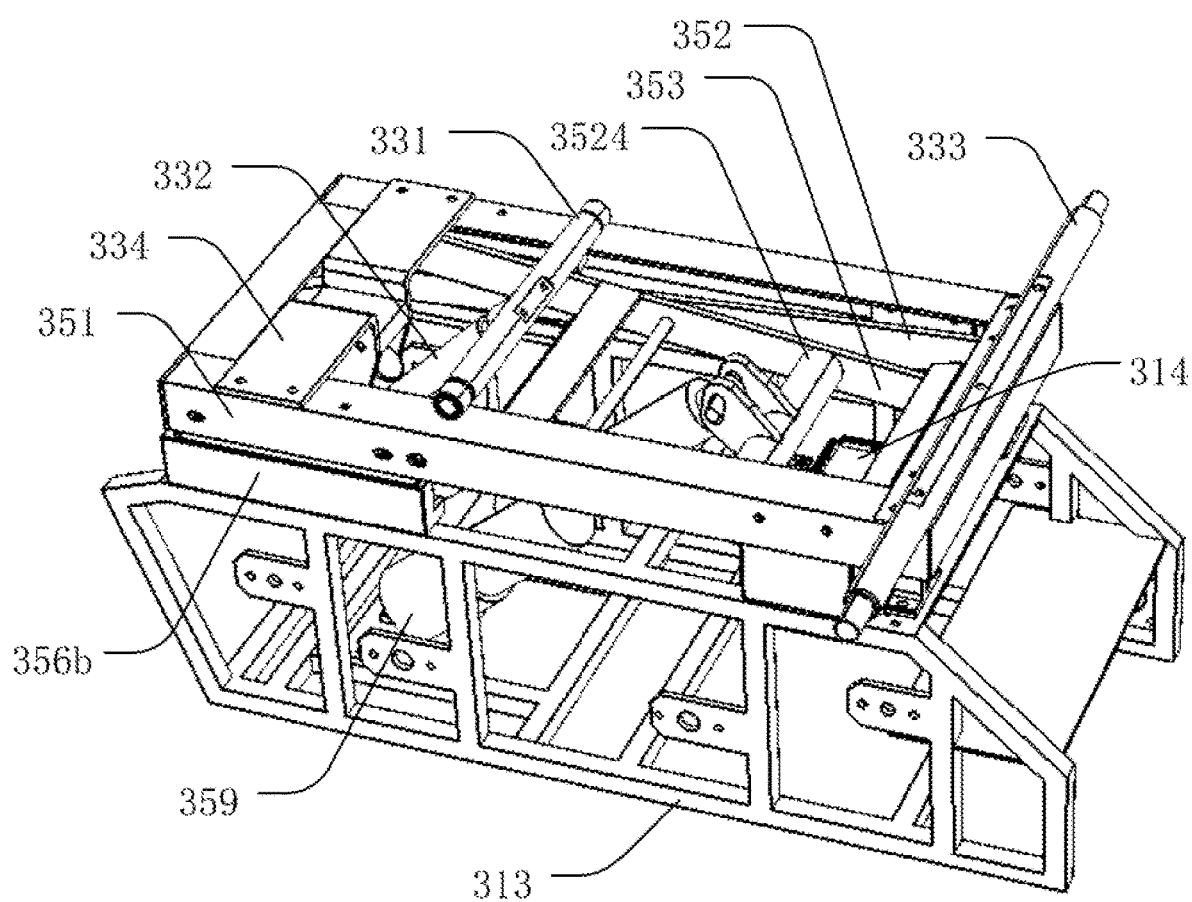
FIG. 12 is a structural schematic diagram of the height regulating device of one embodiment of the present disclosure in a folded state.

As illustrated in FIGS. 5 to 6, and FIGS. 10 to 12, a height regulating device 350 is disposed on the top or the upper section of the vehicle body 310. An angle regulating device 330 is disposed on the top of the height regulating device 350. The shuttle platform 321 is rotatably connected to the top of the angle regulating device 330 to control the tilt angle of the shuttle platform 321. As illustrated in FIGS. 10 to 12, the angle regulating device 330 includes a sliding shaft 331, a second expansion link 332, a rotating shaft 333, and an expansion link mounting frame 334. The second expansion link 332 is a hydraulic expansion link or an electric expansion link. The second expansion link 332 has a second expansion link controller 335. When the second expansion link controller 335 receives instructions of electrical signals, it can control the second expansion link 332 to adjust a length thereof.

Two ends of the sliding shaft 331 can be slidably mounted on two first chutes 325c and 325d. The expansion link mounting frame 334 is fixed on the height regulating device 350. One end of the second expansion link 332 is rotatably connected to a middle section of the sliding shaft 331, and another end thereof is rotatably connected to the expansion link mounting frame 334. A middle section of the rotating shaft 333 is fixedly connected to the height regulating device 350, and two ends thereof are rotatably mounted on base via holes 326c, 326d of two rotating shaft bases 326a, 326b. Therefore, the rotating shaft 333 can relatively rotate to the rotating shaft bases 326a, 326b. When the length of the second expansion link 332 changes, the tilt angle of the shuttle platform 321 can be adjusted to be larger or smaller.

As illustrated in FIGS. 5 to 6 and FIGS. 10 to 12, The height regulating device 350 includes a frame 351, a first bracket 352, a second bracket 353, and a pin roll 354. The shuttle device 320 is rotatably connected to one end of the frame 351. An upper end of the first bracket 352 is slidably connected to the frame 351, and a lower end thereof is rotatably connected to the top of the vehicle body 310. An upper end of the second bracket 353 is rotatably connected to the frame 351, and a lower end thereof is slidably connected to the top of the vehicle body 310. The pin roll 354 penetrates through a middle section of the first bracket 352 and a middle section of the second bracket 353. The second bracket 353 is rotatably connected to the first bracket 352 through the pin roll 354.

The height regulating device 350 further includes two first guide rails 355a, 355b disposed oppositely and two second guide rails 356a, 356b disposed oppositely. The first guide rails 355a, 355b are horizontally mounted on the frame 351. Two second chutes 357a, 357b opposite to each other are respectively disposed on two opposite surfaces of the two first guide rails. The second guide rails 356a, 356b are horizontally mounted on the top of the vehicle body 310. Two third chutes 358a, 358b opposite to each other are respectively disposed on two opposite surfaces of the two second guide rails.

In the angle regulating device 330, the expansion link mounting frame 334 is disposed under the frame 351 and is connected to the frame 351. The middle section of the rotating shaft 333 is fixedly connected to one end of the top or the upper half of the frame 351, and the two ends thereof can be rotatably mounted on two base via holes 326c, 326d of the rotating shaft bases 326a, 326b. Therefore, the rotating shaft 333 can rotate relative to the rotating shaft bases 326a, 326b.

In the height regulating device 350, the first bracket 352 includes two first connecting links 3521a, 3521b and a first beam 3522 disposed in parallel. Two ends of the first beam 3522 are respectively connected to the first connecting links 3521a, 3521b. A first pulley 3523a or 3523b is disposed on an outer side of an upper end of the first connecting link 3521a or 3521b. The two first pulleys 3523a, 3523b are respectively slidably mounted in the second chutes 357a, 357b. The second bracket 353 includes two second connecting links 3531a, 3531b, and a second beam 3532 disposed in parallel. Two ends of the second beam 3532 are respectively connected to the second connecting links 3531a, 3531b. A second pulley 3533a or 3533b is disposed on an outer side of an upper end of the second connecting link 3531a or 3531b. The two second pulleys 3533a, 3533b are respectively slidably mounted in the third chutes 358a, 358b.

The height regulating device 350 further includes a third expansion link 359, one end thereof is rotatably connected to the first bracket 352 or the second bracket 353, and another end thereof is rotatably connected to the vehicle body 310. Preferably, a third beam (not shown in the figure) is disposed on the first bracket 352, and two ends thereof are respectively vertically connected to the two first connecting links 3521a, 3521b. A sleeve 3524 is sleeved outside the third beam. An upper end of the third expansion link 359 is hinged to the sleeve 3524, which can rotate around the third beam.

The third expansion link 359 is a hydraulic expansion link or an electric expansion link. The third expansion link 359 has a second expansion link controller 335. When the third expansion link controller 360 receives commands of electrical signals, it can control the second expansion link 332 to adjust a length thereof.

Figure 18:
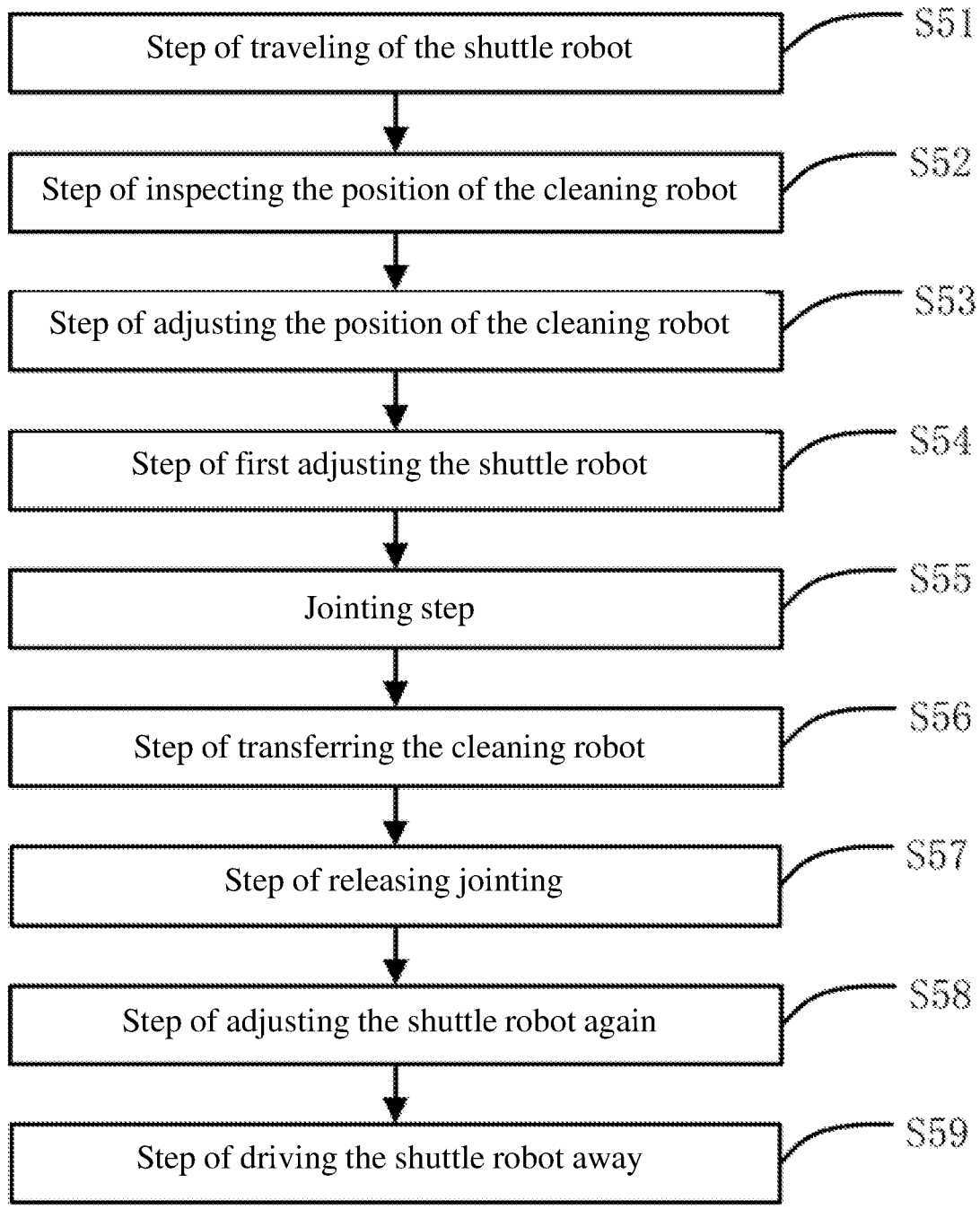
FIG. 18 is a flowchart of a second carrying step of one embodiment of the present disclosure.

The third expansion link 359 is the hydraulic expansion link or the electric expansion link and is connected to the processor 340 (referring to FIG. 18). The processor 340 can send the electrical signal to control the first expansion link 328, the second expansion link 332, and the third expansion link 359 to adjust the lengths.

As illustrated in FIG. 3, when the shuttle robot 300 travels to nearby one cleaning region 500 (the solar panel or the panel arrays), the data processing system 400 controls one shuttle robot 300 to adjust its position and direction to travel to the first shuttle region 505 of a lower-right side of the cleaning region 500, making the entrance 323 of the shuttle device 320 directly face toward a direction of the cleaning region 500.

In this embodiment, when the shuttle robot 300 is traveling in the channel regions 103, the lengths of the second expansion link 332 and the third expansion link 359 are shortened to shortest, the height of the height regulating device 350 is lowered to the lowest. The shuttle platform 321 is horizontally disposed on the top of the vehicle body 310. An included angle between the shuttle platform 321 and the upper surface of the vehicle body 310 is 0 degree. If the cleaning robot 200 is placed on the shuttle platform 321, it can remain stable during transport processes and will not slip off.

As illustrated in FIG. 3, when the shuttle robot 300 travels to the first shuttle region 505 of one cleaning region 500, the processor 340 sends the electrical signal to the second expansion link controller 335 and/or the third expansion link controller 360 to control the second expansion link 332 and/or the third expansion link 359 to extend. Extension of the third expansion link 359 makes the frame 351 and the shuttle platform 321 at the upper end of the height regulating device 350 be raised. Extension of the second expansion link 332 makes one end of the shuttle platform 321 away from the rotating shaft 333 be supported, and another end rotates around the rotating shaft 333. Therefore, an included angle between the shuttle platform 321 and the upper surface of the vehicle body 310 is made to gradually increase, until it is consistent with an included angle of the cleaning region 500 (the solar panel or the panel array) relative to the horizontal plane, thereby making the upper surface of the shuttle platform 321 and the upper surface of the cleaning region 500 panel to be on a same plane.

Similarly, after the shuttle process is completed, the processor 340 sends an electrical signal to the second expansion link controller 335 and/or the third expansion link controller 360 to control the second expansion link controller 332 and/or the third expansion link controller 359 to shorten. Shortening of the second expansion link 332 makes the included angle between the shuttle platform 321 of the shuttle device 320 and the horizontal plane reduce to 0 degree, and the shuttle platform 321 is restored from a tilt state to a horizontal state. Shortening of the third expansion link 359 makes the frame 351 and the shuttle platform 321 at the upper end of the height regulating device 350 are lowered to a lowest point, and then the shuttle platform 300 can travel to other positions.

During the extension or the shortening of the second expansion link 332, two ends of the rotating shaft 333 rotate in the two base via holes 326c, 326d, and two ends of the sliding shaft 331 slide in the two first chutes 325c, 325d, allowing the shuttle platform 321 to maintain the bottom section to be stable without shaking during the adjustment process of the tilt angle.

During the extension or the shortening of the third expansion link 359, a lower end of the first bracket 352 rotates relative to the vehicle body, and the first pulleys 3523a, 3523b on the left and right sides of the upper end thereof slide in the second chutes 357a, 357b respectively. An upper end of the second bracket 353 rotates relative to the shuttle device 320, and the second pulleys 3533a, 3533b on the left and right sides of a lower end thereof slide in the third chutes 358a, 358b respectively. Shapes and dimensions of the first bracket 352 and the second bracket 353 are substantially same. The lengths of the first connecting link 3521b and the second connecting link 3531b are same. The rotation angle of the lower end of the first bracket 352 is same as the rotation angle of the upper end of the second bracket 353. The sliding distance of the upper end of the first bracket 352 is same as the sliding distance of the lower end of the second bracket 353. During lifting and down processes of the height regulating device 350, the shuttle device 320 always remain stable and will not shake. If the shuttle platform 321 carries the cleaning robot 200, the cleaning robot 200 can be guaranteed not to slip off from the shuttle device 320.

If the tilt angles of all solar panels in the operation region 100 are same and remain unchanged, the extension distance of the second expansion link 332 can be a preset constant length. Every time the second expansion link 332 extends, the tilt angles of the shuttle platform 321 after adjusting are same as the tilt angles of the panels.

If the heights of all solar panels in the operation region 100 are same, the extension distance of the third expansion link 332 can also be a preset constant length. The extension distance of the third expansion link 359 can be the preset constant length. Every time the third expansion link 359 is extended, lifted heights of the shuttle platform 321 are same, which are greater than or equal to the height of the lower end of the panel.

If the tilt angles and/or heights of all solar panels in the operation region 100 are different from each other, the data processing system 400 releases instructions to the processor 340 of the shuttle robot 300 according to the heights of the panels and the tilt angles of the panel of the cleaning region 500, the processor 340 releases instructions to the third expansion link 360 to adjust the height of the height regulating device 350 and the height of the shuttle platform 321, and the processor 340 releases instructions to the second expansion link controller 335 to adjust the tilt angle of the shuttle platform 321.

When the tilt angle of the shuttle platform 321 is completely adjusted, the data processing system 400 receives the feedback information from the shuttle robot 300, sends an action instruction to the cleaning robot 200, and controls the cleaning robot 200 to drive from the shuttle region 321 of the first shuttle region 505 to the solar panel of the second shuttle region 506 (an upper plate), or the cleaning robot 200 drives from the solar panel of the second shuttle region 506 to the shuttle platform 321 of the first shuttle region 505 (a lower plate) to complete the shuttle process.

As illustrated in FIG. 12, the shuttle robot 300 mentioned in this embodiment further includes a circuit board 314, which is preferably disposed in the vehicle body 310. One processor 340 is disposed on the circuit board 314 to act as control equipment for the shuttle robot 300. The processor 340 is respectively connected to the first expansion link 329, the second expansion link 335, and the third expansion link 360 to release control instructions to the first expansion link controller 329 and/or the second expansion link controller 335 and/or third expansion link controller 360.

Figure 13:
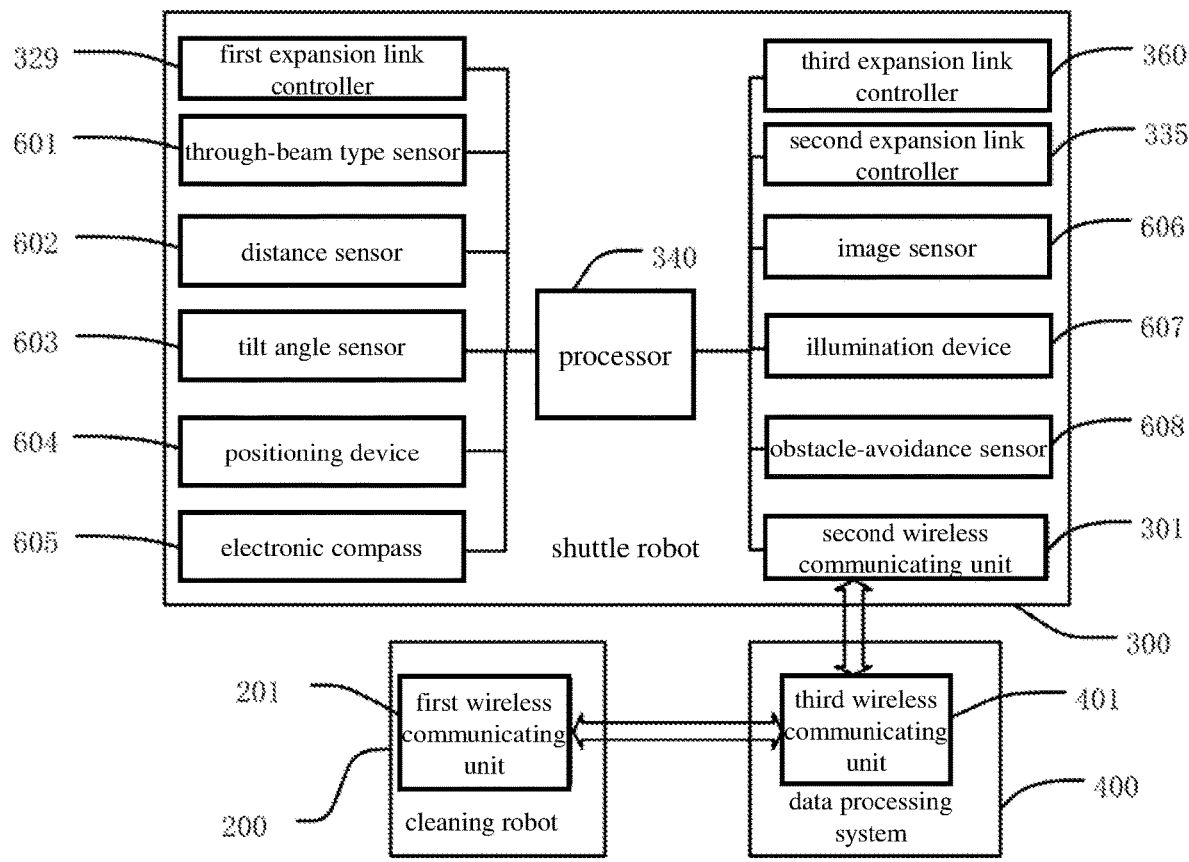
FIG. 13 is a block diagram of electronic devices of the cleaning system of one embodiment of the present disclosure.

As illustrated in FIG. 13, a first wireless communication unit 201 is disposed on the cleaning robot 200, a second wireless communication unit 301 is disposed on the shuttle robot 300, and a third wireless communication unit 401 is disposed on the data processing system 400. The first wireless communication unit 201 and the second wireless communication unit 301 are respectively wirelessly connected to the third wireless communication unit 401 with each other, making the cleaning robot 200 or the shuttle robot 300 and the data processing system 400 can all exchange data by a wireless communication method.

As illustrated in FIG. 4, when the shuttle robot 300 travels to nearby the cleaning region 500 (the solar panel or the panel array), the data processing system 400 controls one shuttle robot 300 to adjust the position and the direction thereof to travel to the first shuttle region 505 of a lower right side of the cleaning region 500, making the entrance 323 of the shuttle robot 320 to face the direction of the cleaning area 500.

As illustrated in FIGS. 5 to 6 and FIGS. 10 to 12, in this embodiment, when the shuttle robot 300 is traveling on the channel regions 103, the length of the second expansion link 332 is shortened to the shortest, the shuttle platform 321 is horizontally disposed on the top of the vehicle body 310, and an included angle between the shuttle platform 321 and the upper surface of the vehicle body 310 is 0 degree. If the cleaning robot 200 is placed on the shuttle platform 321, it can remain stable during transport processes and will not slip off.

Figure 8:
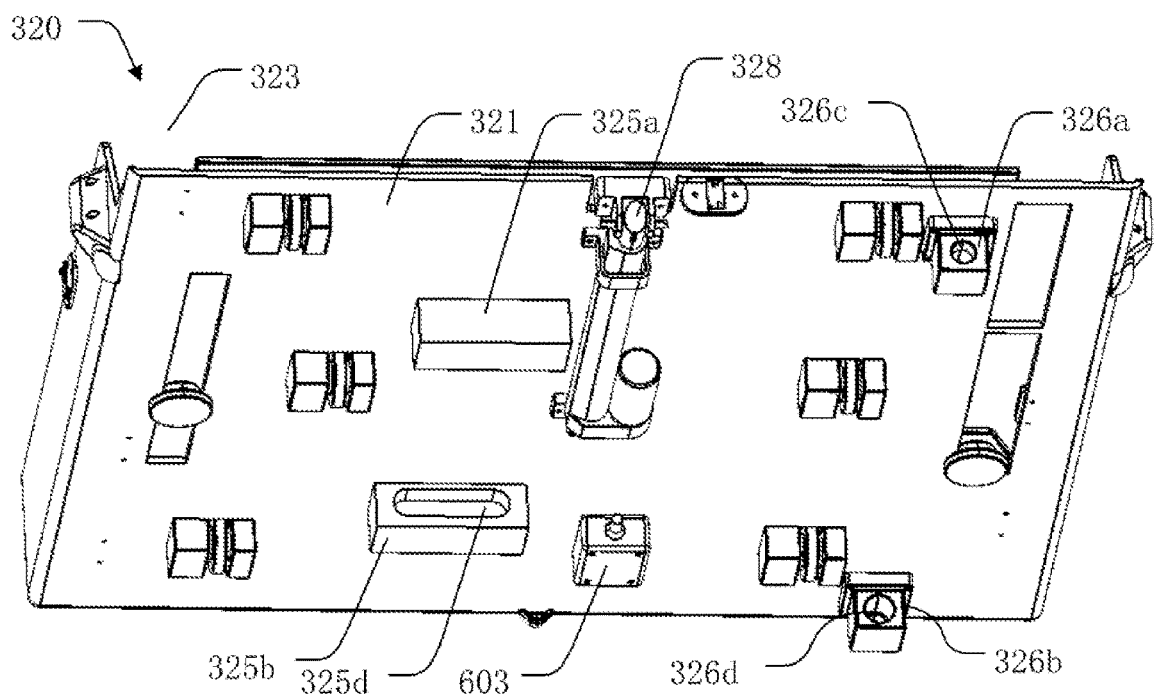
FIG. 8 is a structural schematic diagram of a bottom section of the shuttle device of one embodiment of the present disclosure in one direction.
Figure 9:
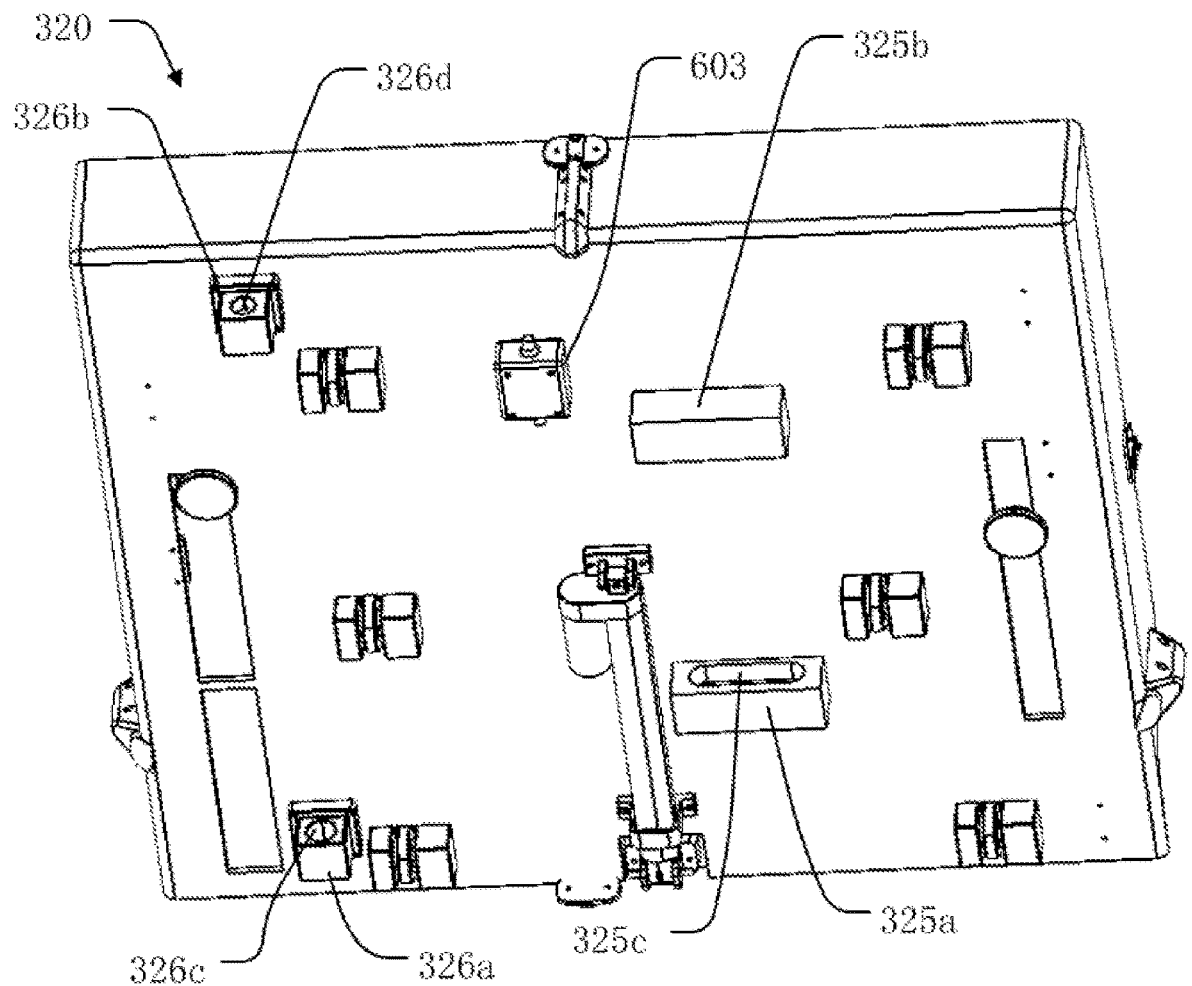
FIG. 9 is a structural schematic diagram of the bottom section of the shuttle device of one embodiment of the present disclosure in another direction.

As illustrated in FIGS. 4 to 6, when the shuttle robot 300 travels to the first shuttle region 505 of the cleaning region 500, the processor 340 sends one electrical signal to the second expansion link controller 335 to control the second expansion link 332 to extend, one end of the shuttle platform 321 away from the rotating shaft 333 is supported, and another end rotates around the rotating shaft 333. Therefore, the included angle between the shuttle platform 321 and the upper surface of the vehicle body 310 is made to gradually increase, until it is consistent with an included angle of the cleaning region 500 (the solar panel or the panel array) relative to the horizontal plane, thereby making the upper surface of the shuttle platform 321 and the upper surface of the cleaning region 500 panel to be on the same plane. As illustrated in FIGS. 7 to 9, during the extension of the second expansion link 332, the two ends of the rotating shaft 333 rotate in the two base via holes 326c, 326d, and two ends of the sliding shaft 331 slide in the two first chutes 325c, 325d, allowing the shuttle platform 321 to maintain the bottom section to be stable without shaking during the adjustment process of the tilt angle.

If the tilt angles of all solar panels in the operation region 100 are same and remain unchanged, the extension distance of the second expansion link 332 can be the preset constant length. Every time the second expansion link 332 extends, the tilt angles of the shuttle platform 321 after adjusting are same as the tilt angles of the panels.

If the tilt angles of all solar panels in the operation region 100 are different from each other, the data processing system 400 releases instructions to the processor 340 of the shuttle robot 300 according to the tilt angles of the panels in the cleaning region 500, and the processor 340 releases instructions to the second expansion link controller 335 to adjust the tilt angle of the shuttle platform 321.

When the tilt angle of the shuttle platform 321 is completely adjusted, the data processing system 400 receives the feedback information from the shuttle robot 300, sends an action instruction to the cleaning robot 200, and controls the cleaning robot 200 to drive from the shuttle region 321 of the first shuttle region 505 to the solar panel of the second shuttle region 506 (an upper plate), or the cleaning robot 200 drives from the solar panel of the second shuttle region 506 to the shuttle platform 321 of the first shuttle region 505 (a lower plate) to complete the shuttle process.

In this embodiment, when the shuttle platform 321 is in a tilt state, the height of the lowest point of the shuttle platform 321 is greater than or equal to the lowest end of the solar panel or the panel array in the operation region 100 (such as the lower end of the cleaning region 502). The height of the highest point of the shuttle platform 321 is less than or equal to the highest end of the solar panel or the panel array in the operation region 100 (such as the upper end of the cleaning region 501), which ensures the shuttle platform 321 can be comprehensively jointed to the left or right of the solar panel or the panel array (such as the left end of the cleaning region 503 or the right end of the cleaning region 504) during the shuttle process.

Regardless of whether the shuttle platform 321 is in the tilt state or the flat state, the height of the lowest position of the shuttle platform 321 is substantially same, and the height basically depends on the height of the top of the vehicle body 310. Preferably, the shuttle position of the shuttle platform 321 and the panel is located on a lower section of the right side of the panel or the panel arrays, which have relatively lower height requirement on the vehicle body 310. The lower a center of gravity of the vehicle body 310 is, the more stable the shuttle robot 300 will be during carrying the cleaning robot in the traveling process, which effectively prevents bumps and shaking caused by uneven road surfaces.

As illustrated in FIG. 13, in this embodiment, a variety of data collecting devices are disposed in the shuttle robot 300 to collect various work data during the operation process of the shuttle robot 300. The data collecting devices include different types of sensors, such as a through-beam type sensor 601, distance sensor 602, a tilt angle sensor 603, a positioning device 604, an electronic compass 605, an image sensor 606, an illumination device 607, an obstacle-avoidance sensor 608, etc. Each of the above-mentioned sensors is wired or wirelessly connected to the processor 340. Collected original operation data during the operation process of the shuttle robot 300 is transmitted to the processor 340, and is processed by the processor 340 to form preprocessed data. The original operation data and/or the preprocessed data are sent to the data processing system 400 through the wireless communication units to realize real-time monitoring for the operation process of the shuttle robot 300 and real-time control of the traveling process and/or the shuttle process of the shuttle robot 300.

As illustrated in FIGS. 5 to 7, the through-beam type sensor 601 includes an emission terminal 601a and a receiving terminal 601b disposed oppositely. The emission terminal 601a and the receiving terminal 601b are respectively disposed on the inner side wall of the left baffle 322a and the right baffle 322c of the shuttle device 320. The emission terminal 601a and the receiving terminal 601b are close to the entrance 323 and are respectively disposed on two sides of the entrance 323. The through-beam type sensor 601 is preferably a through-beam type infrared sensors. Infrared ray emitted by the emission terminal 601a is obtained by the receiving terminal 601b. When the infrared ray is blocked, the processor 340 can determine that an item passes through the entrance 323.

When one cleaning robot 200 travels from outside to the entrance the shuttle device 320, the infrared ray between the emission terminal 601a and the receiving terminal 601b is blocked, then the through-beam type sensor 601 can sense that a front end of the cleaning robot 200 travels to the shuttle device 320. When the whole body of the cleaning robot 200 travels completely inside the shuttle device 320, the infrared ray between the emission terminal 601a and the receiving terminal 601b return to an unblocked state, and the through-beam type sensor 601 can sense that a rear end of the cleaning robot 200 also travels to the shuttle device 320. According to a real-time electrical signal of the through-beam type sensor 601, the processor 340 can determine that there is the front end of one cleaning robot 200 travels to the shuttle device 320 and also can determine that there is the whole body of one cleaning robot 200 completely travels into the shuttle device 320.

The distance sensor 602 is disposed on the inner side wall in the middle of the rear baffle 322b of the shuttle device 320, and is disposed opposite to the entrance 323. The distance sensor 602 is preferably a reflective infrared sensor. The reflective infrared sensor continuously emits an infrared ray toward the entrance 323. If the reflected infrared ray can be received, it can be determined that there is the cleaning robot 200 enters the shuttle platform 321 from the entrance 323. Furthermore, a distance between the front end of the cleaning robot 200 and the rear baffle 322b of the shuttle device 320 can be obtained according to a time of received infrared rays.

When one cleaning robot 200 travels from outside to the entrance of the shuttle platform 320, the distance sensor 602 (the reflective infrared sensor) can determine that there is the cleaning robot 200 traveling to the shuttle platform 320 and can determine a distance of the front end of the cleaning robot 200 and the rear baffle 322b according to times of received reflected infrared rays. The processor 340 obtains a value of the distance and can monitor a progress of the cleaning robot 200 entering the shuttle device 320 in real time, and determines whether the whole body of the cleaning robot 200 travels into the shuttle platform 321.

When one cleaning robot 200 drives out of the shuttle platform 320 through the entrance, the distance sensor 602 (reflective infrared sensor) can determine that there is the cleaning robot 200 traveling out of the shuttle device 320, and can determine the distance between the front end of the cleaning robot 200 and the rear baffle 322b according to times of the obtained reflected infrared rays. Obtaining a value of the distance by the processor 340, a progress of the cleaning robot 200 leaving the shuttle device 320 can be monitored in real time, and whether the whole body of the cleaning robot 200 travels out of the shuttle platform 321 can be determined.

The tilt angle sensor 603 is preferably disposed on a lower surface of the shuttle platform 321 (referring to FIG. 8) to measure the included angle between the upper surface of the shuttle platform 321 and the horizontal plane (the platform tilt angle) in real time and to transmit an angle value of the tilt angle of the platform to the processor 340. If the tilt angles of all the solar panels in the operation region 100 are different or the tilt angles of some panels are variable, every time the second expansion link 332 extends, the tilt angle sensor 603 monitors the tilt angle value of the platform in real time and sends it to the processor 340. When a real-time tilt angle value of the platform is as same as an angle value of the tilt angle of the panel, the processor 340 sends a stop instruction to the second expansion link controller 335 to stop the second expansion link 332 extending, making the tilt angle of the platform be as the same as the tilt angle of the panel.

In this embodiment, the positioning device 604 is a radio frequency identification (RFID) reader, which is disposed inside or outside the vehicle body 310, preferably is disposed in the bottom of the vehicle body 310 or the front end of the shuttle platform 321, is configured to obtain a real-time position of the vehicle body 310 in the operation region, and transmits the real-time position of the vehicle body 310 to the processor 340.

In this embodiment, a label positioning solution is used, a recommended route is preset in the channel regions 103, the vehicle body 310 is controlled to travel along the recommended route. One set of identifiable labels such as RFID tags, are disposed during every certain distance on the recommended route. Each identifiable label stores data such as a position coordinate of the label in the operation region, etc. When the shuttle robot 300 travels to a certain positioning point, the RFID reader reads the preset RFID tag at the positioning point, and the processor 340 obtains the real-time position of the shuttle robot 300, and selectively, transmits the real-time position to the data processing system 400. In other embodiments, the positioning device 604 can also be a high-precision global positioning system (GPS) positioning unit or a BEIDOU positioning unit, and the real-time position of the shuttle robot 300 can also obtained.

The electronic compass 605 is preferably disposed inside or outside the vehicle body 310 to obtain a real-time traveling direction of the shuttle robot 300, and the real-time traveling direction is transmitted to the processor 340 for data processing and data analysis for determining whether the real-time traveling direction of the shuttle robot 300 is consistent with the preset direction. If the shuttle robot 300 deviates from a preset direction, the processor 340 sends a control instruction to the vehicle body 310 to adjust the traveling direction of the vehicle body 310 in real time.

Preferably, an image sensor 606 and/or an illumination device 607 are disposed at front end and/or a rear end of the vehicle body 310. The image sensor 606 is configured to collect real-time images and/or pictures of the front and/or the rear end of the vehicle body 310 in real time and sends them to the processor 340. When the shuttle robot 300 travels in the channel regions 103 of the operation region 100, image contents collected by the image sensor 606 includes feasibly traveling regions in the channel regions 103 at any time and are sent to the processor 340. The processor 340 calculates an expected travel region covered by the vehicle body 310 in a next period according to a real-time travel speed of the vehicle body 310 and compares the expected travel region and feasibly traveling regions at each moment in real time to determine whether the car body 310 is still in the feasibly traveling region in the next period. If the expected travel area exceeds a range of the feasibly traveling regions, it proves that there is an obstacle on a traveling route of the vehicle body 310, and the processor 340 needs to adjust the travel direction of the vehicle body 310 in real time to prevent the vehicle body 310 from crashing into the obstacle during traveling.

In other embodiments, the image contents collected by the image sensor 606 may also include bezels of the solar panel and/or the panel arrays, and the bezels are displayed as a bezel line in the picture. In other embodiments, after processing by a specific algorithm, the shuttle robot 300 can adjust the traveling direction in real time with reference to the position of the bezel line, so that the shuttle robot 300 may travel in a straight line as much as possible.

When the shuttle robot 300 is traveling in a dark environment (such as night, cloudy, etc.), the illumination sensor 607 is used to illuminate the channel regions in front of and/or behind the vehicle body 310, which is conducive to the image sensor 606 being able to collect images and or pictures normally. In some other embodiments, the image sensor 606 and/or the illumination device 607 may also be disposed on the left and/or the right side of the vehicle body 310 to collect real-time images and/or pictures on the left and/or right side of the vehicle body 310 in real time. In some other embodiments, the image sensor 606 and/or the illumination device 607 can also be disposed on one side of the shuttle device 320, and a camera of the image sensor 606 faces toward outside. When the height and the tilt angle of the shuttle platform 321 are adjusted to be consistent with the solar panel 102, the camera directly faces toward the solar panel 102.

The obstacle-avoidance sensor 608, which preferably is an ultrasonic sensor, is disposed on the front and/or rear end of the vehicle body 310. During the traveling process of the shuttle robot 300, when the processor 340 obtains sensing signals sent by the obstacle-avoidance sensor 608 at the front or rear end, the processor 340 can determine that there is an obstacle in the front or rear of the traveling route of the vehicle body that affects driving, so that the processor 340 can adjust the traveling direction of the shuttle robot 300 to avoid the obstacles. In other embodiments, the obstacle-avoidance sensor 608 may also be on the left and/or the right side of the vehicle body 310.

The present disclosure provides the cleaning system for the solar panel cleaning work to dispatch a suitable number of cleaning robots and shuttle robots according to workload of the cleaning task, using the cleaning robots to complete the cleaning task on the solar panel or solar panel array, and using the shuttle robot to transfer the cleaning robot between the multiple solar panel arrays, can complete the cleaning tasks of all solar panels and panel arrays in the shortest time.

Figure 14:
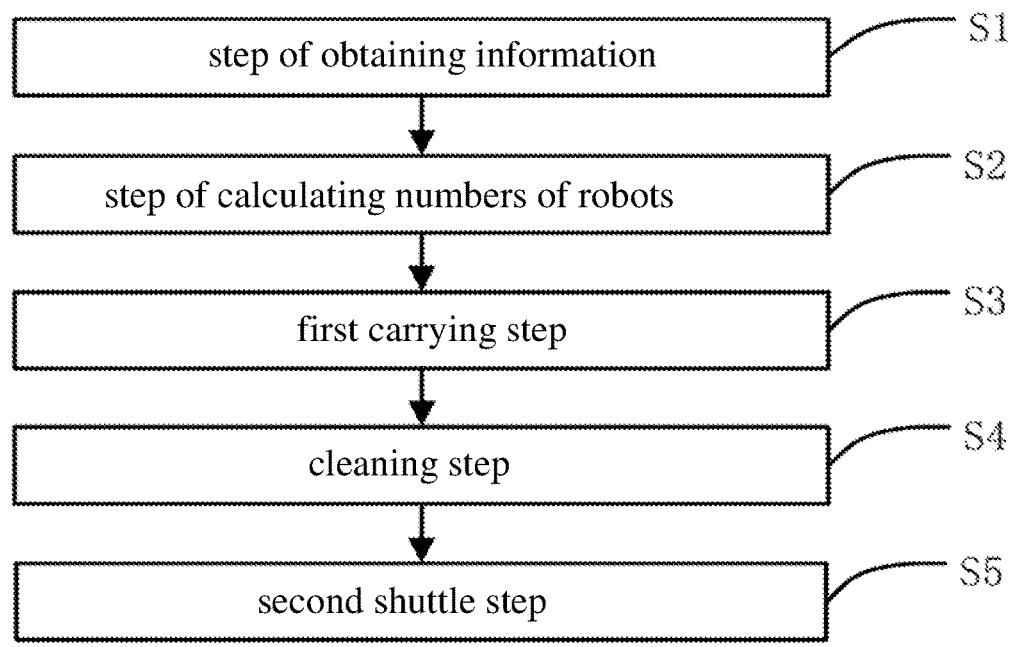
FIG. 14 is a flowchart of a cleaning method of one embodiment of the present disclosure.

As illustrated in FIG. 14, on the basis of the aforesaid cleaning system for the solar panel, the present disclosure further provides a cleaning method for the solar panel, including the following steps S1 to S5.

Step S1 of obtaining information: obtaining operation region information and job task information. The operation region information includes a map of the operation region, the operation region includes all of the cleaning regions and two or more of the channel regions between the cleaning regions. At least one positioning point is disposed in the channel region during every certain distance, at least one identifiable label (such as an RFID tag) is disposed in each positioning point, the identifiable label stores a position and a serial number of the positioning point. The operation region further includes serial numbers, dimensions, and positions of each cleaning region in the operation region and the position and the serial number of the at least one positioning point. The job task information further includes a serial number of the cleaning region needed to be cleaned and an operation time range allowed for the cleaning task.

Figure 15:
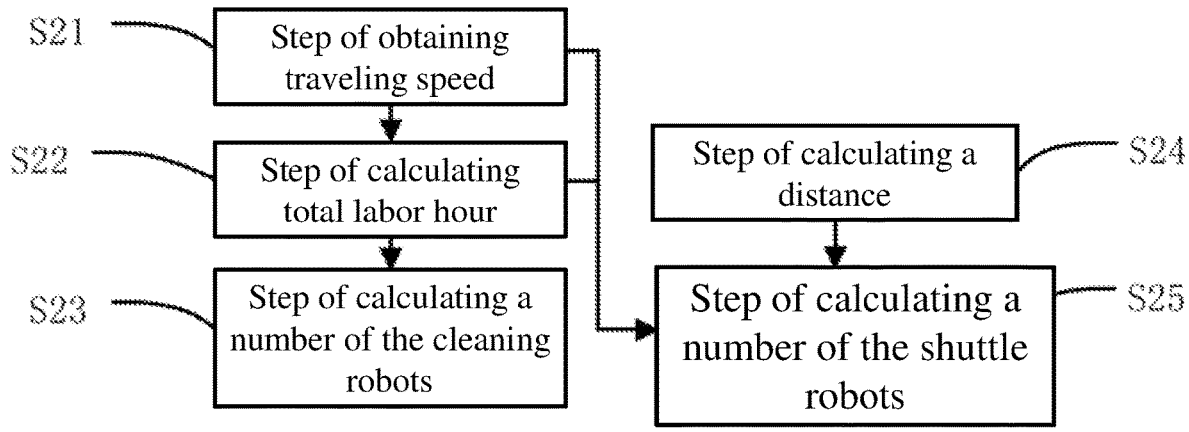
FIG. 15 is a flowchart of a step of calculating numbers of robots of one embodiment of the present disclosure.

Step S2 of calculating numbers of robots: calculating the numbers of the cleaning robot and the shuttle robot need to be deployed. As illustrated in FIG. 15, the step of calculating the numbers of the robots specifically includes following steps: Step S21 of obtaining traveling speed: obtaining a traveling speed of the cleaning robot and a traveling speed of the shuttle robot; Step S22 of calculating total labor hour: calculating required labor hours to complete the cleaning task in each cleaning region according to the dimensions of the cleaning region that needs to be cleaned of the job task information and the traveling speed of the cleaning robot; Step S23 of calculating a number of the cleaning robots: calculating the number M of the cleaning robot that need to be deployed according to a total number of the cleaning regions that need to be cleaned, the labor hour required to complete the cleaning task in each cleaning region, and the operation time range; Step S24 of calculating a distance: calculating a total distance that the shuttle robot needs to travel according to the positions of the cleaning regions that need to be cleaned; and Step S25 of calculating a number of the shuttle robots: calculating the number N of the shuttle robot that needs to be deployed according to a total mileage and the traveling speed of the shuttle robot.

Figure 16:
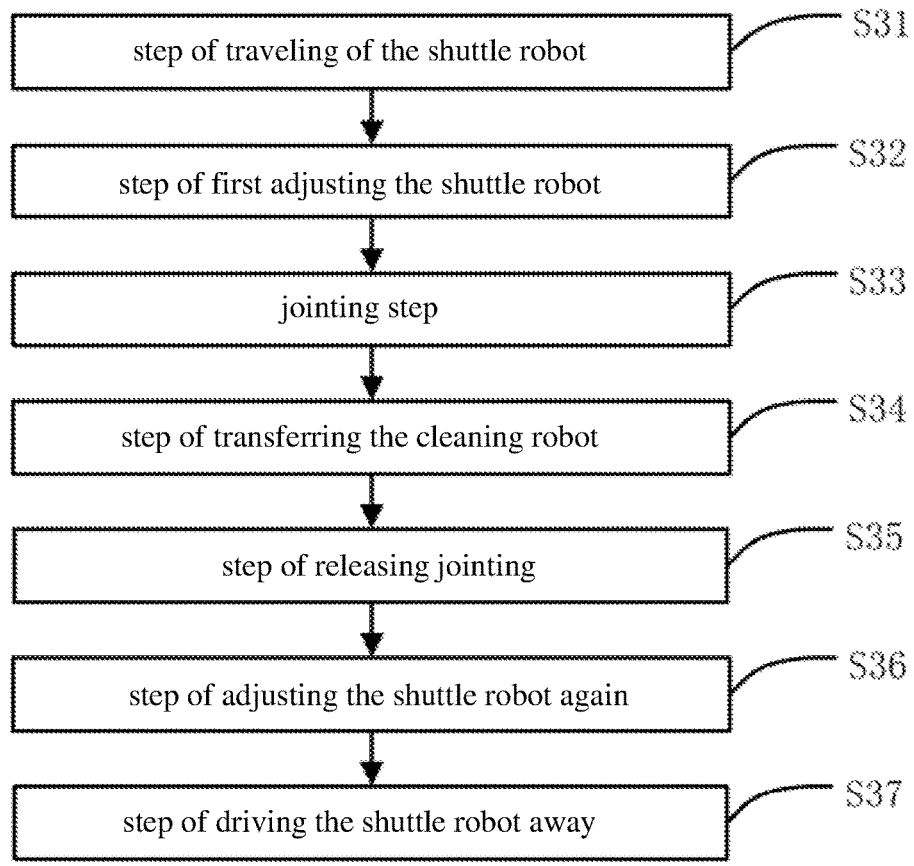
FIG. 16 is a flowchart of a first carrying step of one embodiment of the present disclosure.

As illustrated in FIG. 16, S3 is a first carrying step: carrying a cleaning robot to cleaning regions by a shuttle robot. The first carrying step includes following steps S31 to S37: Step S31 of traveling of the shuttle robot: making the shuttle robot carrying the cleaning robot travel to the first shuttle region of one of the cleaning regions, wherein the first shuttle region is a region outside one of the cleaning regions and close to a side of the one of the cleaning regions; Step S32 of first adjusting the shuttle robot: adjusting a height and a tilt angle of the shuttle platform by the shuttle robot, and adjusting a position of the shuttle robot; Step S33 of jointing: jointing the shuttle robot to the cleaning region, wherein the shuttle robot to extend a bridge board to connect with the upper surface of the shuttle platform and the upper surface of the operation region; Step S34 of transferring the cleaning robot: making the cleaning robot travel to the second shuttle region of the cleaning region, wherein the second shuttle region is a region within the one of the cleaning regions and close to a side of the one of the cleaning regions; Step S35 of releasing jointing: controlling the shuttle robot to retract the bridge board to make the upper surface of the shuttle platform separate from the upper surface of the operation region; Step S36 of adjusting the shuttle robot again: adjusting the height and the angle of the shuttle platform by the shuttle robot to make the height of the shuttle platform to a lowest position and keep in a horizontal state; and Step S37 of driving the shuttle robot away: controlling the shuttle robot to leave away from the cleaning region.

In step S31 of traveling of the shuttle robot, a destination location and a map of the channel regions of the shuttle robot are known. Using the aforesaid positioning device 604 (tag positioning unit) can realize automatic navigation. Similarly, high-precision GPS units can also be used for realizing navigation.

Figure 17:
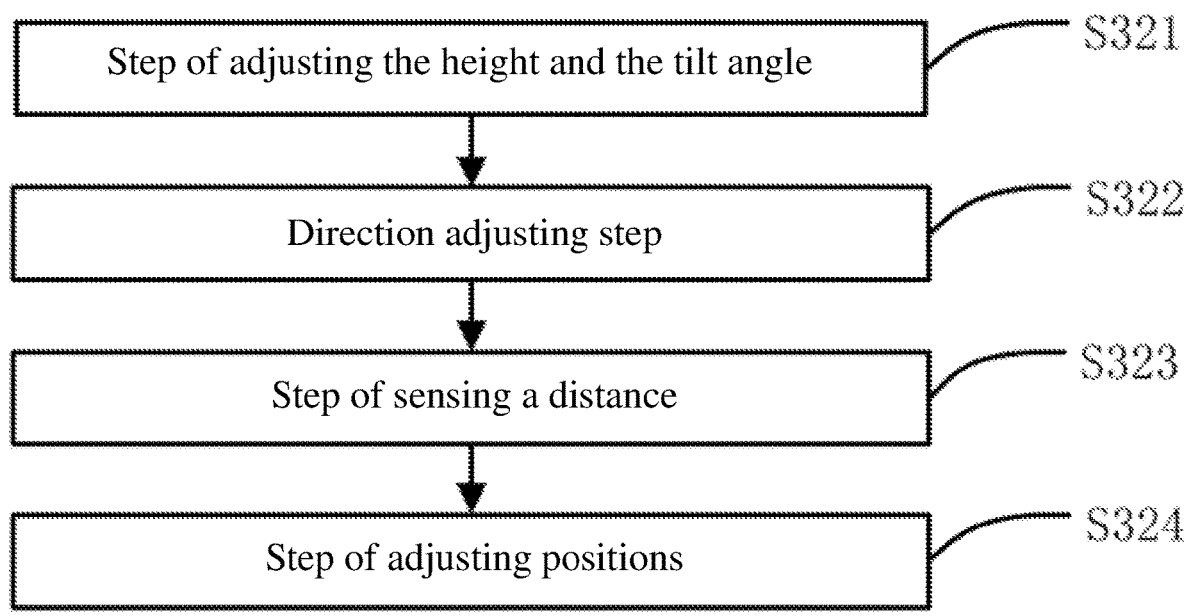
FIG. 17 is a flowchart of a step of adjusting the shuttle robot of the first carrying step of one embodiment of the present disclosure.

As illustrated in FIG. 17, the step S32 of adjusting the shuttle robot includes following steps S321 to S324: Step 321 of adjusting the height and the tilt angle: adjusting the height and the tilt angle of the shuttle platform to make an upper surface of the shuttle platform and an upper surface of the cleaning region on a same plane; Step 322 of direction adjusting: adjusting a direction of an entrance of the shuttle platform to make the entrance of the shuttle platform face the cleaning region; Step 323 of sensing a distance: obtaining a distance S between the shuttle robot and a bezel of the cleaning region by the shuttle robot to determine whether the actual distance S is greater than a preset distance threshold value S0; and Step 324 of adjusting positions making the shuttle robot turn right at a first angle A and go forward with a first distance B, then making the shuttle robot turn left at the first angle A and go backward with a second distance certain distance C to travel to the first shuttle region, when the distance S is greater than S0; wherein B is (S-S0)/sinA, C is (S-S0)/tanA; making the shuttle robot turn left at the first angle A and go forward with the first distance B, then making the shuttle robot turn right at the first angle A and go backward with the second distance C to travel to the first shuttle region, when the distance S is less than S0; wherein B is (S0-S)/sinA, C is (S-S0)/tanA. After the step S32 of adjusting the shuttle robot, the shuttle platform is flush with the upper surface of the panel array, and the distance between the shuttle robot and the cleaning region (the solar panel) is also adjusted to an optimal distance (close to the preset distance threshold value S0).

In the step S36 of adjusting the shuttle platform again, the shuttle robot reduces the height of the shuttle platform to the lowest point and maintains it in the horizontal state, which effectively reduces the center of gravity and effectively prevents the cleaning robot from sliding down or turning one of its side during the traveling process of the shuttle robot.

Cleaning step S4: after the cleaning robot travels to the cleaning region, the cleaning robot performs a cleaning task on the cleaning regions from up to down according to the preset route. At the same time, the shuttle robot drives away from this cleaning region and rushes to a storage region or neighbor of another cleaning region to perform a next task for receiving the cleaning robot. After the cleaning robot completes the cleaning task, it automatically travels to the second shuttle region 506 at the bottom of the cleaning region (the solar panel) and waits to be transported away by another shuttle robot. Because areas of each cleaning region are known, and speeds of the cleaning robots are also known, the operation progress of the cleaning robot can be calculated during the cleaning task. When the operation progress of the cleaning robot on the solar panel reaches a preset threshold, such as 80%, the cleaning robot can send a reminder signal to the data processing system, and the data processing system searches for all idle shuttle robots near the panel immediately, and orders one nearest shuttle robot to go to the first shuttle region 505 of the panel to pick up the cleaning robot. This solution can reduce the waiting time of cleaning robots and the shuttle robot and improves the overall cleaning efficiency of the power station.

Second carrying step S5: carrying the cleaning robot away from the cleaning regions by the shuttle robot after the cleaning robot complete the cleaning task. As illustrated in FIG. 18, the second carrying step includes following steps: Step S51 of traveling of the shuttle robot: making the shuttle robot which is unloaded travel to the first shuttle region of one of the cleaning regions; Step S52 of inspecting the position of the cleaning robot: making the shuttle robot to judge whether the cleaning robot is located in the second shuttle region; if not, proceed to a next step; Step S53 of adjusting the position of the cleaning robot: adjusting the position of the cleaning robot to the second shuttle region; Step S54 of first adjusting the shuttle robot: controlling the shuttle robot to adjust a height and a tilt angle of the shuttle platform; Step S55 of jointing: jointing the shuttle robot to the cleaning region, wherein the shuttle robot to extend a bridge board to connect with the upper surface of the shuttle platform and the upper surface of the operation region; Step S56 of transferring the cleaning robot: making the cleaning robot travel to the second shuttle region of the cleaning region; Step S57 of releasing jointing: controlling the shuttle robot to retract the bridge board to make the upper surface of the shuttle platform separate from the upper surface of the operation region; Step S58 of adjusting the shuttle robot again: controlling the shuttle robot to adjust the height and the angle of the shuttle platform to make the height of the shuttle platform to a lowest position and keep in a horizontal state; and Step S59 of driving the shuttle robot away: controlling the shuttle robot to leave away from the cleaning region.

In step S51 of traveling of the shuttle robot, the destination location and the map of the channel regions of the shuttle robot are known. By using the aforesaid positioning device 604 (tag positioning unit) can realize automatic navigation. Similarly, high-precision GPS units can also be used for realizing navigation.

In the present disclosure, during the process of the cleaning robot traveling from the cleaning region to the shuttle robot, if the position of the cleaning robot deviates from the second shuttle region, it may fall from a high position during the shuttle process, and there is a certain safety risk. Therefore, in this embodiment, it is necessary to add a step of inspecting the position of the cleaning robot and a step of adjusting the position of the cleaning robot.

Figure 19:
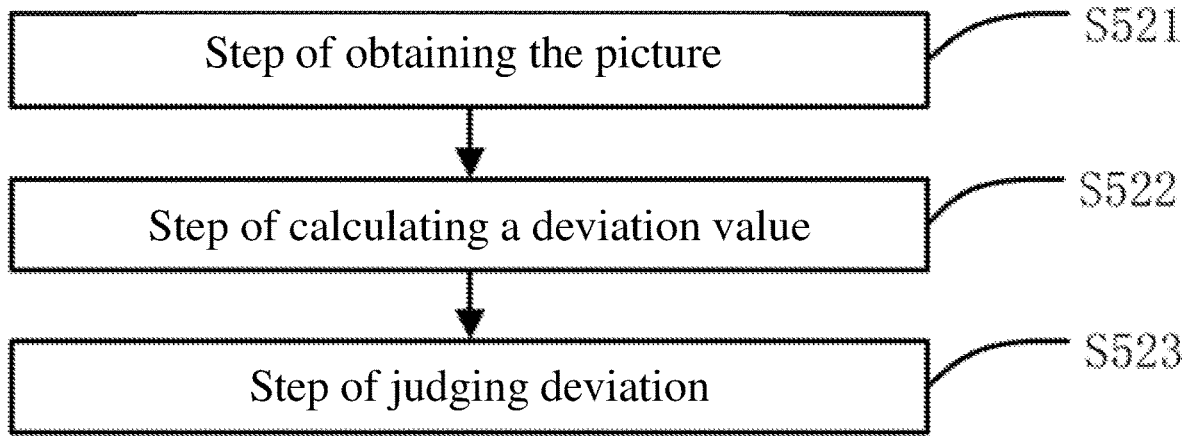
FIG. 19 is a flowchart of a step of inspecting a position of a cleaning robot of one embodiment of the present disclosure.

As illustrated in FIG. 19, the step S52 of inspecting the position of the cleaning robot includes following steps: Step S521 of obtaining the picture: obtaining a real-time picture by a camera on a side of the shuttle robot facing toward the solar panel, wherein the picture includes a picture of the second shuttle region and includes a picture mark on the cleaning robot; Step S522 of calculating a deviation value: calculating the deviation value D of the position from a preset position in the real-time picture; Step S523 of judging deviation: judging that the cleaning robot has arrived the second shuttle region if an absolute value of the deviation value D is less than a preset threshold value D0; judging that the cleaning robot has deviated from the second shuttle region if the absolute value of the deviation value D is greater than or equal to the preset threshold value D0. The picture mark is a mark attached on the front end or the back end of the cleaning robot in advance. A photo of the cleaning robot before jointing is preset in the shuttle robot or the data processing system. A location of the mark in the photo is determined. By comparing the position of the mark in an actual photo to the position in the preset photo, whether the shuttle robot deviates from the second shuttle region can be judged.

Figure 20:
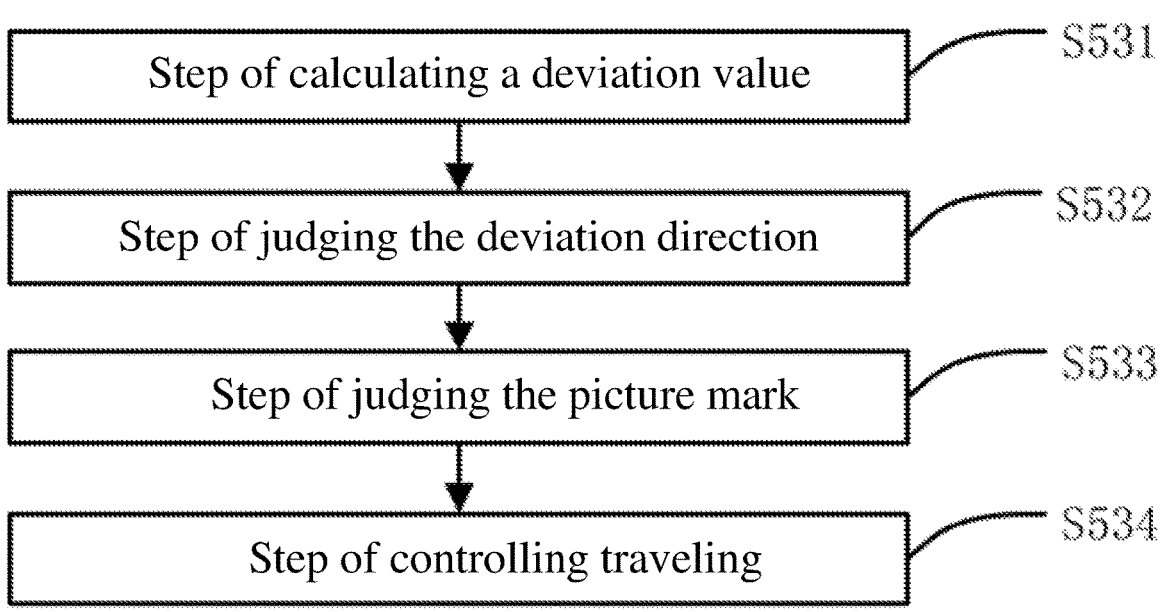
FIG. 20 is a flowchart of a step of adjusting the position of the cleaning robot of one embodiment of the present disclosure.

As illustrated in FIG. 20, the step S53 of adjusting the position of the cleaning robot includes following steps: Step S531 of calculating a deviation value: calculating the deviation value D of the position from a preset position in the real-time picture; Step S532 of judging the deviation direction: judging a deviation direction of the cleaning robot according to the deviation value; Step S533 of judging the picture mark: judging whether the picture mark is located on a front surface or a back surface of the cleaning robot; Step S534 of controlling traveling: if the cleaning robot deviated to left, and the picture mark is disposed on the front surface of the cleaning robot, the cleaning robot turns right at a second angle F and moves backward with a second distance G, and then turns left at the second angle F, moves forward with a third distance H, and travels to the second shuttle region; if the cleaning robot deviated to left, and the picture mark is disposed on the back surface of the cleaning robot, the cleaning robot turns right at the second angle F and moves forward with the second distance G, and then turns left at the second angle F, moves backwards with the third distance H, and travels to the second shuttle region; if the cleaning robot deviated to right, and the picture mark is disposed on the front surface of the cleaning robot, the cleaning robot turns left at the second angle F and moves backward with the second distance G, and then turns right at the second angle F, moves forward with the third distance H, and travels to the second shuttle region; if the cleaning robot deviated to right, and the picture mark is disposed on the front surface of the cleaning robot, the cleaning robot turns left at the second angle F and moves backward with the second distance G, and then turns right at the second angle F, moves forward with the third distance H, and travels to the second shuttle region; if the cleaning robot deviated to right, and the picture mark is disposed on the back surface of the cleaning robot, the cleaning robot turns left at the second angle F and moves forward with the second distance G, and then turns right at the certain angle F, moves backward with the third distance H, and travels to the second shuttle region; wherein G is E/sinF, H is E/tanF. The step S52 of inspecting the position of the cleaning robot and the step S53 of adjusting the position of the cleaning robot can ensure that the cleaning robot and the shuttle robot maintain a relative positional relationship, and further ensure the safety travelling of the cleaning robot during the transfer process.

Figure 21:
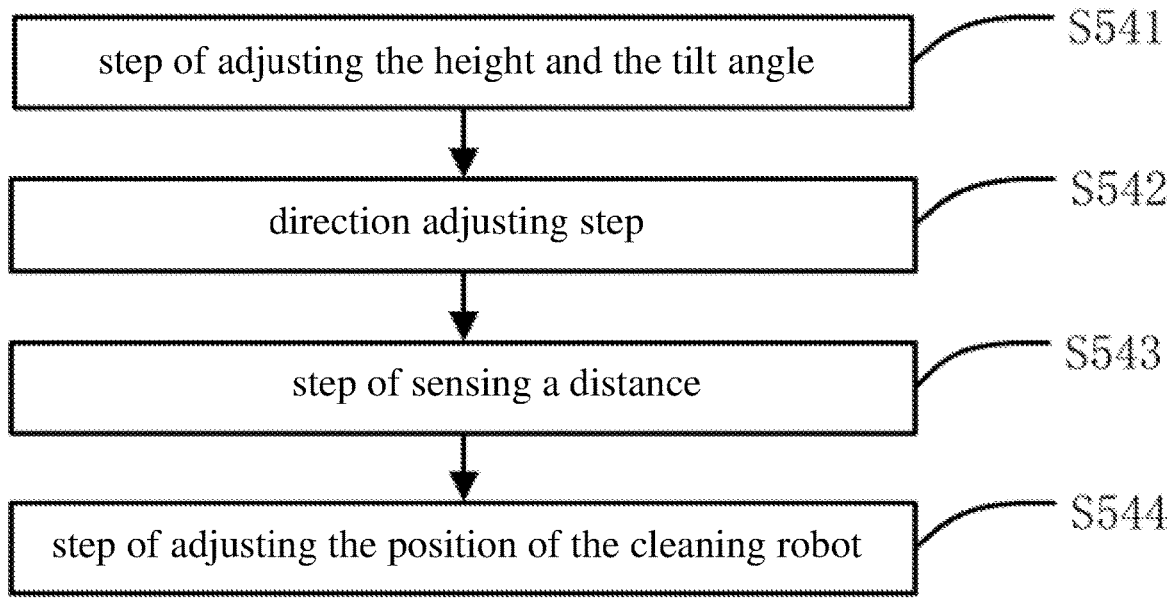
FIG. 21 is a flowchart of a step of first adjusting the shuttle robot of the second carrying step of one embodiment of the present disclosure.

As illustrated in FIG. 21, the step S54 of adjusting the shuttle robot includes following steps S541 to S544: step S541 of adjusting the height and the tilt angle: adjusting the height and the tilt angle of the shuttle platform to make an upper surface of the shuttle platform and an upper surface of the cleaning region on a same plane, and makes the entrance of the shuttle platform face toward the solar panel; Step S542 of direction adjusting: adjusting a direction of an entrance of the shuttle platform to make the entrance of the shuttle platform face the cleaning region; Step S543 of sensing a distance: obtaining a distance S between the shuttle robot and a bezel of the cleaning region by the shuttle robot to determine whether the actual distance S is greater than a preset distance threshold value S0; and Step S544 of adjusting the position of the cleaning robot making the shuttle robot turn right at a first angle A and go forward with a first distance B, then making the shuttle robot turn left at the first angle A and go backward with a second distance C to travel to the first shuttle region, when the distance S is greater than S0; wherein B is (S-S0)/sinA, C is (S-S0)/tanA; making the shuttle robot turn left at the first angle A and go forward with the first distance B, then making the shuttle robot turn right at the first angle A and go backward with the second distance C to travel to the first shuttle region, when the distance S is less than S0; wherein B is (S0-S)/sinA, C is (S-S0)/tanA. After the step of adjusting the shuttle robot S54, the shuttle platform is flush with the upper surface of the panel array, and the distance between the shuttle robot and the cleaning region (the solar panel) is also adjusted to an optimal distance (close to the preset distance threshold value S0). In the step of adjusting the shuttle platform again S56, the shuttle robot reduces the height of the shuttle platform to the lowest point and maintains it in the horizontal state, which effectively reduces the center of gravity and effectively prevents the cleaning robot from sliding down or turning one of its side during the traveling process of the shuttle robot.

Figure 22:
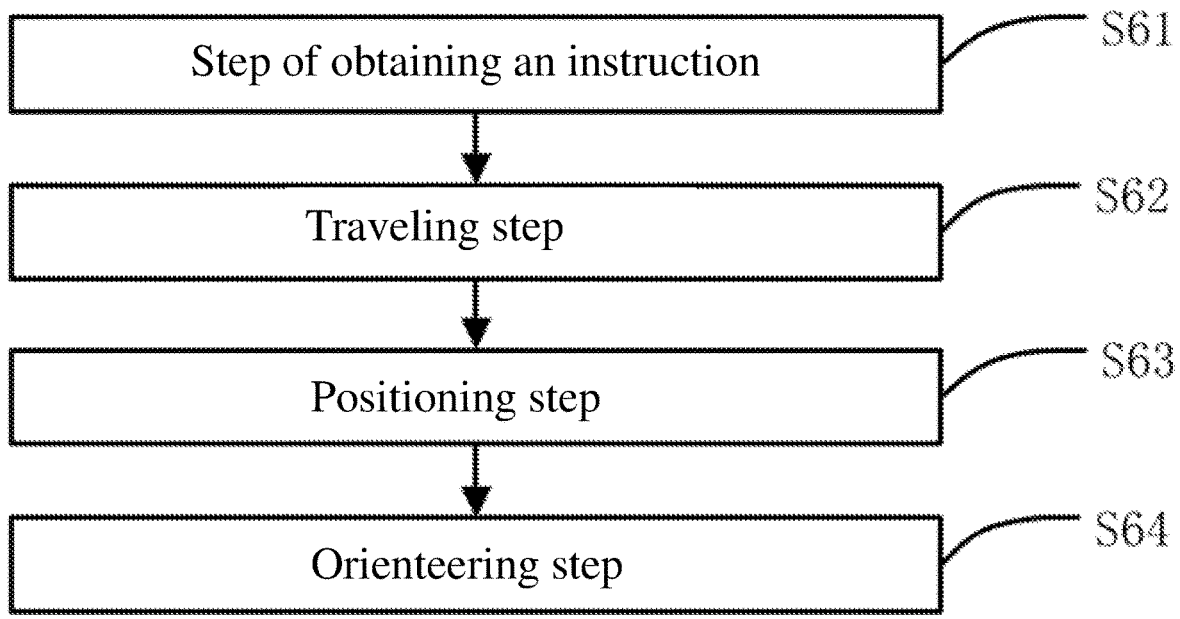
FIG. 22 is a flowchart of an orienting step of one embodiment of the present disclosure.

As illustrated in FIG. 22, in the first carrying step or the second carrying step, such as in the steps S31 and S51 of traveling of the shuttle robot and the steps S37 and S59 of driving the shuttle robot away, the shuttle robot performs orienting steps during the traveling process, which specifically includes the following steps S61 to S64. Step S61 of obtaining an instruction: obtaining a first control instruction released by the data processing system, wherein the first control instruction includes an end position of a carrying path and a recommended route of the shuttle robot, and includes a serial number of each positioning point on the recommended route and a corresponding preset traveling direction of each positioning point; Step S62 of traveling: traveling along the recommended route to the end according to the first control instruction; Step S63 of positioning: reading the identifiable label (such as an RFID tag) of any positioning point and obtaining the position and the serial number of the positioning point; the shuttle robot sends a feedback signal to the data processing system; and the data processing system obtains a real-time position of the shuttle robot according to the feedback signal; and Step S64 of orienting: determining whether an actual traveling direction is consistent with the preset traveling direction corresponding to the positioning point, if not, adjusting an actual travel direction to the preset travel direction. The steps S61 to S64 are used to realize the navigation of the shuttle robot to ensure that the shuttle robot travels to the first shuttle region accurately and to prevent deviation from the preset route.

Figure 23:
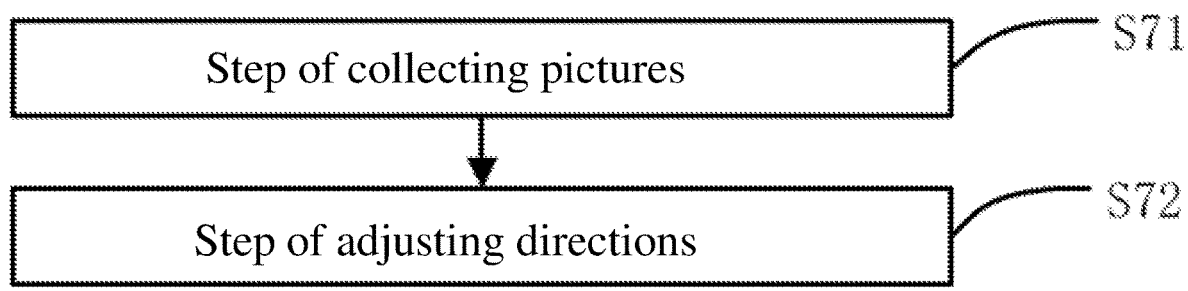
FIG. 23 is a flowchart of direction fine-adjusting steps of one embodiment of the present disclosure.

As illustrated in FIG. 23, in the first carrying step or the second carrying step, such as in the steps S31 and S51 of traveling of the shuttle robot and in the steps S37 and S59 of driving the shuttle robot away, direction fine-adjusting steps are further included. The following steps S71 to S72 are specifically included. Step S71 of collecting pictures: using a camera to collect real-time pictures, when the shuttle robot is traveling; and Step S72 of adjusting directions: judging the feasible traveling route and/or locations of obstacles according to the real-time pictures by the shuttle robot or the data processing system, and adjusting the traveling direction of the shuttle robot accordingly. The steps S71-S72 are used to realize the obstacle avoidance effect during the traveling process of the shuttle robot and to prevent the robot from being damaged during the traveling.

The present disclosure provides the cleaning method for the cleaning task of the solar panel to dispatch a suitable number of cleaning robots and shuttle robots according to workload of the cleaning task, using the cleaning robots to complete the cleaning task on the solar panel or solar panel array, and using the shuttle robot to transfer the cleaning robot between the multiple solar panel arrays, can complete the cleaning tasks of all solar panels and panel arrays in the shortest time.

The present disclosure is described by the related embodiments mentioned above. However, the embodiments mentioned above are examples of the present disclosure. It should be noted that the disclosed embodiments are not intended to limit the scope of the present disclosure. Rather, modifications and equivalent arrangements included in the spirit and scope of the claims are included in the scope of the present disclosure.

The subject matter of the present disclosure can be manufactured and used in the industry and has industrial applicability.

What is claimed is:

1. A cleaning method comprising:
obtaining operation region information and job task information by a data processing system in a step of obtaining information;
calculating numbers of cleaning robots and shuttle robots that need to be deployed by the data processing system in a step of calculating numbers of robots;
carrying a cleaning robot to cleaning regions by a shuttle robot in a first carrying step;
performing a cleaning task on the cleaning regions by the cleaning robot in a cleaning step; and
carrying the cleaning robot away from the cleaning regions by the shuttle robot in a second carrying step;
wherein the operation region information comprises a map of an operation region, the operation region comprises all of the cleaning regions and two or more channel regions between the cleaning regions; at least one positioning point is disposed in the channel regions, at least one identifiable label is disposed in each positioning point, and the at least one identifiable label stores a position and a serial number of the at least one positioning point; the operation region comprises serial numbers, dimensions, and positions of each cleaning region in the operation region and the position and the serial number of the at least one positioning point; and the job task information comprises a serial number of the cleaning region needed to be cleaned and an operation time range allowed for the cleaning task.

2. The cleaning method as claimed in claim 1, wherein the step of calculating the numbers of the robots specifically comprises:
obtaining a traveling speed of the cleaning robot and a traveling speed of the shuttle robot in a step of obtaining traveling speed;
calculating required labor hours to complete the cleaning task in each cleaning region according to the dimensions of the cleaning region that needs to be cleaned of the job task information and the traveling speed of the cleaning robot in a step of calculating total labor hour;
calculating a first number of the cleaning robots that need to be deployed according to a total number of the cleaning regions that need to be cleaned, the labor hour required to complete the cleaning task in each cleaning region, and the operation time range in a step of calculating the number of the cleaning robots;
calculating a total distance that the shuttle robot needs to travel according to the positions of the cleaning regions that need to be cleaned in a step of calculating the distance; and
calculating a second number of the shuttle robots that need to be deployed according to a total mileage and the traveling speed of the shuttle robot in a step of calculating the number of the shuttle robots.

3. The cleaning method as claimed in claim 1, wherein in the first carrying step or the second carrying step, during traveling, the shuttle robot executes:
obtaining a first control instruction released by the data processing system in a step of obtaining instruction, wherein the first control instruction comprises an end position of a carrying path and a recommended route of the shuttle robot, and comprises a serial number of each positioning point on the recommended route and a preset traveling direction corresponding to each positioning point;

traveling along the recommended route to the end position according to the first control instruction in a traveling step;

reading the at least one identifiable label of any positioning point and obtaining the position and the serial number of the positioning point in a positioning step; and determining whether an actual traveling direction is consistent with the preset traveling direction corresponding to the positioning point, if not, adjusting the actual travel direction to the preset travel direction in an orienting step.

4. The cleaning method as claimed in claim 1, wherein in the first carrying step or the second carrying step, when the shuttle robot reads the at least one identifiable label of any positioning point, the shuttle robot sends a feedback signal to the data processing system; and the data processing system obtains a real-time position of the shuttle robot according to the feedback signal.

5. The cleaning method as claimed in claim 1, wherein in the first carrying step or the second carrying step, comprises:

using a camera to collect real-time pictures when the shuttle robot is traveling in a step of collecting pictures; and adjusting a traveling direction of the shuttle robot by judging a feasible traveling route and positions of obstacles according to the real-time pictures in a step of adjusting directions.

6. The cleaning method as claimed in claim 1, wherein the second carrying step comprises:

making the shuttle robot which is unloaded travel to a first shuttle region of one of the cleaning regions in a step of traveling of the shuttle robot;

jointing the shuttle robot to the cleaning region in a jointing step; and making the cleaning robot travel to a second shuttle region of the cleaning region in a step of transferring the cleaning robot.

7. The cleaning method as claimed in claim 6, wherein in the second carrying step, before the jointing step, the cleaning method comprises:

making the shuttle robot judge whether the cleaning robot is located in the second shuttle region, if not, proceed to a next step in a step of inspecting a position of the cleaning robot; and adjusting the position of the cleaning robot to the second shuttle region in a step of adjusting the position of the cleaning robot.

8. The cleaning method as claimed in claim 7, wherein the step of inspecting the position of the cleaning robot comprises:

obtaining a real-time picture in a step of obtaining the real-time picture, wherein the real-time picture comprises a picture mark on the cleaning robot;

calculating a deviation value of the position from a preset position in the real-time picture in a step of calculating the deviation value;

judging that the cleaning robot has arrived at the second shuttle region if an absolute value of the deviation value is less than a preset threshold value; or judging that the cleaning robot has deviated from the second shuttle region if the absolute value of the deviation value is greater than or equal to the preset threshold value in a step of judging deviation.

9. The cleaning method as claimed in claim 7, wherein the step of adjusting the position of the cleaning robot comprises:

calculating a deviation value of the position from a preset position in the real-time picture in a step of calculating the deviation value;

judging a deviation direction of the cleaning robot according to the deviation value in a step of judging the deviation direction;

judging whether a picture mark is located on a front surface or a back surface of the cleaning robot in a step of judging the picture mark;

in a step of controlling traveling, if the cleaning robot deviated to left, and the picture mark is disposed on the front surface of the cleaning robot, the cleaning robot turns right at a second angle and moves backward by a second distance, and then turns left at the second angle, moves forward by a third distance, and travels to the second shuttle region;

if the cleaning robot deviated to left, and the picture mark is disposed on the back surface of the cleaning robot, the cleaning robot turns right at the second angle and moves forward by the second distance, and then turns left at the second angle, moves backwards by the third distance, and travels to the second shuttle region;

if the cleaning robot deviated to right, and the picture mark is disposed on the front surface of the cleaning robot, the cleaning robot turns left at the second angle and moves backward by the second distance, and then turns right at the second angle, moves forward by the third distance, and travels to the second shuttle region; and if the cleaning robot deviated to right, and the picture mark is disposed on the back surface of the cleaning robot, the cleaning robot turns left at the second angle and moves forward by the second distance, and then turns right at the second angle, moves backward by the third distance, and travels to the second shuttle region; and wherein, F is the second angle, G is the second distance, H is the third distance, and G is E/sinF, H is E/tanF.

10. The cleaning method as claimed in claim 1, wherein the first carrying step comprises:

making the shuttle robot carrying the cleaning robot travel to a first shuttle region of one of the cleaning regions in a step of traveling of the shuttle robot;

jointing the shuttle robot to the cleaning region in a jointing step; and making the cleaning robot travel to a second shuttle region of the cleaning region in a step of transferring the cleaning robot.

11. The cleaning method as claimed in claim 10, wherein before the jointing step, the cleaning method comprises:

adjusting a height and a tilt angle of a shuttle platform by the shuttle robot, and adjusting a position of the shuttle robot in a step of first adjusting the shuttle robot;

the step of first adjusting the shuttle robot comprises following steps:

adjusting the height and the tilt angle of the shuttle platform to make an upper surface of the shuttle platform and an upper surface of the cleaning region on a same plane in a step of adjusting the height and the tilt angle;

adjusting a direction of an entrance of the shuttle platform to make the entrance of the shuttle platform face the cleaning region in a direction adjusting step;

obtaining an actual distance between the shuttle robot and a bezel of the cleaning region by the shuttle robot to determine whether the actual distance is greater than a preset distance threshold value in a step of sensing distance;

making the shuttle robot turn right at a first angle and go forward by a first distance, then making the shuttle robot turn left at the first angle and go backward by a second distance to travel to the first shuttle region, when the actual distance is greater than the preset distance threshold value; wherein S is the actual distance, S0 is the preset distance threshold value, A is the first angle, B is the first distance, C is the second distance, and B is (S−S0)/sinA, C is (S−S0)/tanA; or making the shuttle robot turn left at the first angle and go forward by the first distance, then making the shuttle robot turn right at the first angle and go backward by the second distance to travel to the first shuttle region, when the actual distance is less than the preset distance threshold value; wherein B is (S0−S)/sinA, C is (S−S0)/tanA, in a step of adjusting positions.

12. The cleaning method as claimed in claim 10, wherein after the step of transferring the cleaning robot, the cleaning method comprises:

making the shuttle robot release jointing to separate an upper surface of the shuttle platform from an upper surface of the cleaning region in a step of releasing jointing;

adjusting the height and the tilt angle of the shuttle platform by the shuttle robot to make the height of the shuttle platform to a lowest position and keep in a horizontal state, in a step of adjusting the shuttle robot again; and making the shuttle robot be away from the cleaning region in a step of driving the shuttle robot away.

13. The cleaning method as claimed in claim 12, wherein making the shuttle robot extend a bridge board to connect with the upper surface of the shuttle platform and an upper surface of the operation region in the jointing step; and making the shuttle robot retract the bridge board to separate the upper surface of the shuttle platform from the upper surface of the operation region in the releasing jointing step.

14. A cleaning system, comprising:

cleaning robots configured to perform cleaning task on cleaning regions;

shuttle robots configured to carry the cleaning robots on channel regions; and a data processing system connected to the cleaning robots and the shuttle robots, configured to control the shuttle robots to carry the cleaning robots to the cleaning regions or take away the cleaning robots from the cleaning regions or configured to control the cleaning robots to complete the cleaning task on the cleaning regions, wherein the data processing system obtains operation region information and job task information, and the data processing system calculates numbers of the cleaning robots and the shuttle robots that need to be deployed;

wherein the cleaning regions and more than two channel regions located between the cleaning regions are included by an operation region; and wherein the operation region information comprises a map of the operation region, the operation region comprises all of the cleaning regions and two or more channel regions between the cleaning regions; at least one positioning point is disposed in the channel regions, at least one identifiable label is disposed in each positioning point, and the at least one identifiable label stores a position and a serial number of the at least one positioning point; the operation region comprises serial numbers, dimensions, and positions of each cleaning region in the operation region and the position and the serial number of the at least one positioning point; and the job task information comprises a serial number of the cleaning region needed to be cleaned and an operation time range allowed for the cleaning task.

15. The cleaning system as claimed in claim 14, wherein the cleaning regions comprise:

a first shuttle region, wherein the first shuttle region is a region outside one of the cleaning regions and close to a side of the one of the cleaning regions; and a second shuttle region, wherein the second shuttle region is a region within the one of the cleaning regions, close to the side of the one of the cleaning regions, and defined opposite to first shuttle region.

16. The cleaning system as claimed in claim 14, wherein the shuttle robots comprise:

a vehicle body;

a shuttle device comprising a shuttle platform configured to place the cleaning robots;

a height regulating device comprising a frame, a first bracket, a second bracket, and a pin roll, wherein the shuttle device is connected to the frame, the first bracket is connected to the frame and the vehicle body, the second bracket is connected to the frame and the vehicle body, and the pin roll penetrates through the first bracket and the second bracket; and an angle regulating device comprising a sliding shaft, an expansion link, a rotating shaft, and an expansion link mounting frame, wherein the expansion link mounting frame is fixed on the height regulating device, the expansion link is connected to the sliding shaft and the expansion link mounting frame, and the rotating shaft is connected to the height regulating device.

* * * * *